US012563237B2

(12) United States Patent
Yan et al.

(10) Patent No.: US 12,563,237 B2
(45) Date of Patent: Feb. 24, 2026

(54) WAVELET TRANSFORM DOMAIN CONVOLUTIONAL NEURAL NETWORK BASED IN-LOOP FILTERING FOR VIDEO CODING

(71) Applicant: Beijing Dajia Internet Information Technology Co. Ltd., Beijing (CN)

(72) Inventors: Ning Yan, San Diego, CA (US); Wei Chen, San Diego, CA (US); Xiaoyu Xiu, San Diego, CA (US); Che-Wei Kuo, San Diego, CA (US); Yi-Wen Chen, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 18/419,736

(22) Filed: Jan. 23, 2024

(65) Prior Publication Data

US 2024/0163488 A1     May 16, 2024

Related U.S. Application Data

(63) Continuation of application No. PCT/US2022/036911, filed on Jul. 13, 2022.

(Continued)

(51) Int. Cl.
*H04N 19/82* (2014.01)
*H04N 19/124* (2014.01)
*H04N 19/89* (2014.01)

(52) U.S. Cl.
CPC .......... *H04N 19/82* (2014.11); *H04N 19/124* (2014.11); *H04N 19/89* (2014.11)

(58) Field of Classification Search
CPC ...... G06N 3/045; G06N 3/0464; G06N 3/048; G06N 3/09; H04N 19/124; H04N 19/63; H04N 19/82; H04N 19/89
See application file for complete search history.

(56) References Cited

U.S. PATENT DOCUMENTS

2018/0109785 A1     4/2018   Chen et al.
2019/0075301 A1*    3/2019   Chou ................... H04N 19/132
(Continued)

FOREIGN PATENT DOCUMENTS

KR      20210075826 A  *  6/2020
WO      2020034078 A1     2/2020

OTHER PUBLICATIONS

International Search Report and Written Opinion in related PCT Application No. PCT/US2022/036911 dated Jan. 4, 2023 (10 pages).
(Continued)

*Primary Examiner* — Md N Haque
(74) *Attorney, Agent, or Firm* — Bayes PLLC

(57) ABSTRACT

Implementations of the disclosure provide video processing apparatuses and methods. The method receives, by a video processor, a video block of a video for in-loop filtering. The method then performs a wavelet-domain CNN filtering on video data of at least a part of the video block, by performing, by the video processor, a wavelet transform on the video data to obtain data in a wavelet domain comprising a plurality of wavelet subbands; filtering, by the video processor, the data in the wavelet domain by applying respective CNN models on the plurality of wavelet subbands, where the CNN models for the plurality of wavelet subbands are trained in the wavelet domain; and performing, by the video processor, an inverse wavelet transform on the filtered data to obtain reconstructed video data.

17 Claims, 22 Drawing Sheets

Related U.S. Application Data

(60) Provisional application No. 63/225,982, filed on Jul. 27, 2021.

(56) References Cited

U.S. PATENT DOCUMENTS

| | | | |
|---|---|---|---|
| 2021/0021823 A1* | 1/2021 | Na | G06N 3/08 |
| 2021/0329286 A1* | 10/2021 | Wang | G06N 3/045 |
| 2022/0191483 A1* | 6/2022 | Li | G06N 3/084 |
| 2022/0329819 A1* | 10/2022 | Kerofsky | H04N 19/136 |

OTHER PUBLICATIONS

Ouyang et al., Joint Video Experts Team (JVET) OFITU-T SG 16 WP 3 and ISO/IEC JTC 1/SC 29, [Document: JVET-T0069-v2 (version 2)], 20th Meeting: by teleconference, pp. 1-7, Oct. 7, 2020

A [retrieved on Dec. 6, 2022] from https://jvet-experts.org/ (8 pages).

Liu et al., Deep Learning-Based Video Coding: a Review and a Case Study, arXiv: 1904.12462vl [cs.MM], pp. 1-34, Apr. 29, 2019 [retrieved on Dec. 7, 2022] from <https://arxiv.org/pdf/1904.12462. pdf> (35 pages).

Zhang et al., A Novel In-Loop Filtering Mechanism of HEVC Based on 3D Sub-Bands and CNN Processing, Signal, Image and Video Processing, pp. 1045-1053, Feb. 18, 2019 [retrieved on Dec. 6, 2022] from <https://link.springer.com/article/10.1007/sl 1760-1-25. 30-33.38-40 019-01444-1> (9 pages).

Extended European Search Report in related European Application No. 22850083.1 dated Apr. 23, 2025 (11 pages).

Qi et al., "EE1-1.8: Test on the 1-15 CNN-Based Post-Processing Filter Proposed in JVET-Z0144", Joint Video Experts Team (JVET) of ITU-T SG 16 WP 3 and 1SO/IEC JTC 1/SC 29 27th Meeting, by teleconference, Jul. 13-22, 2022.

\* cited by examiner

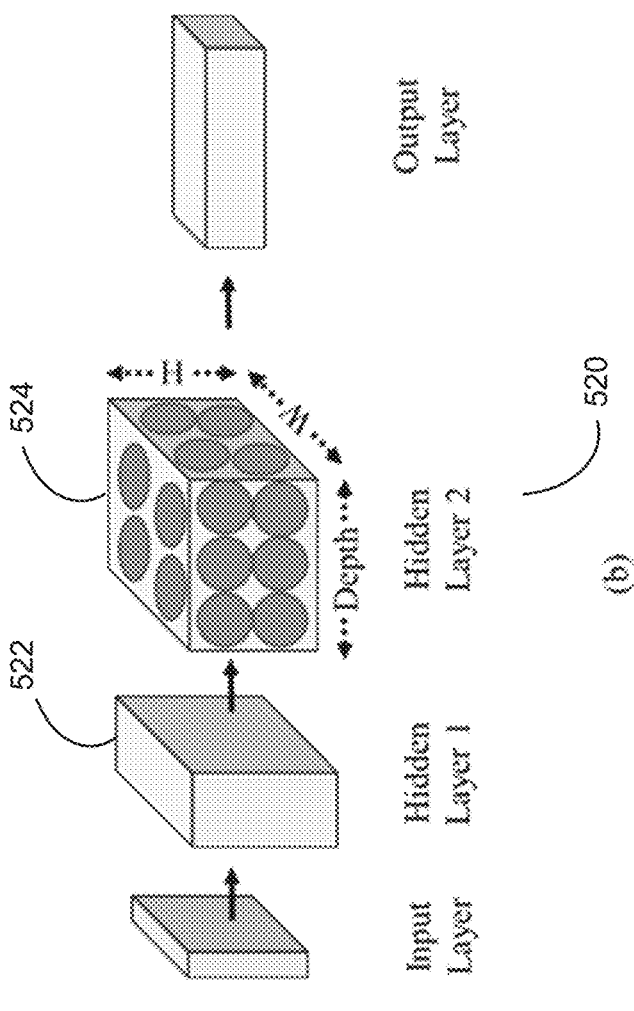
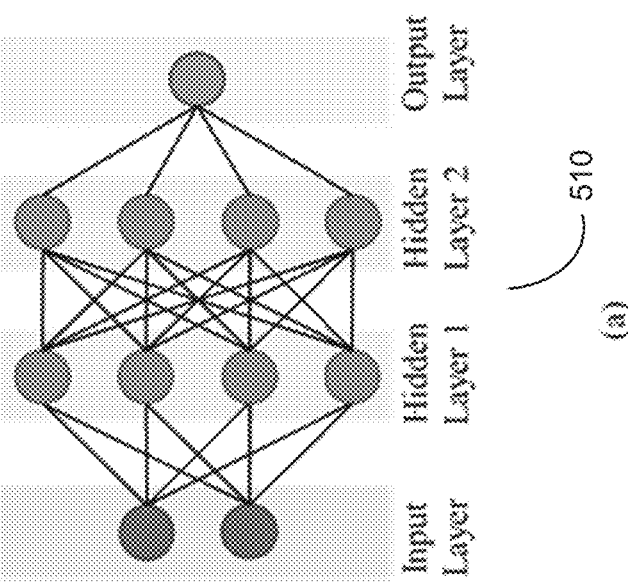
FIG. 5

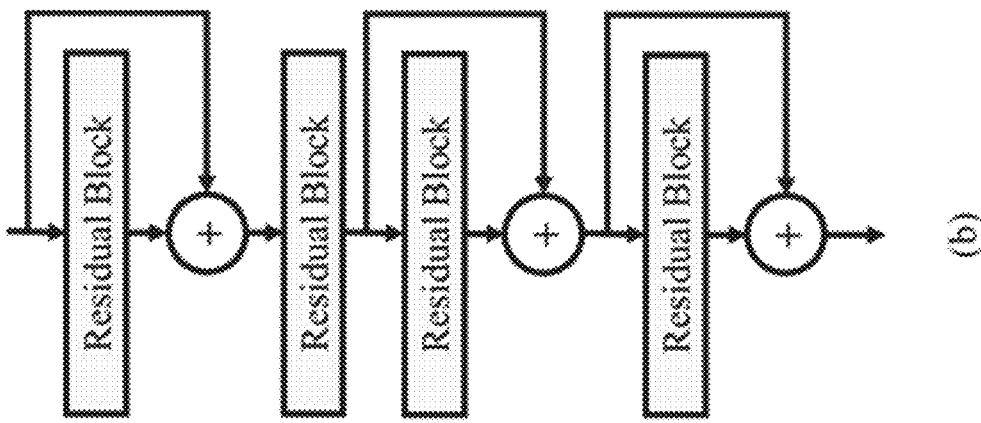
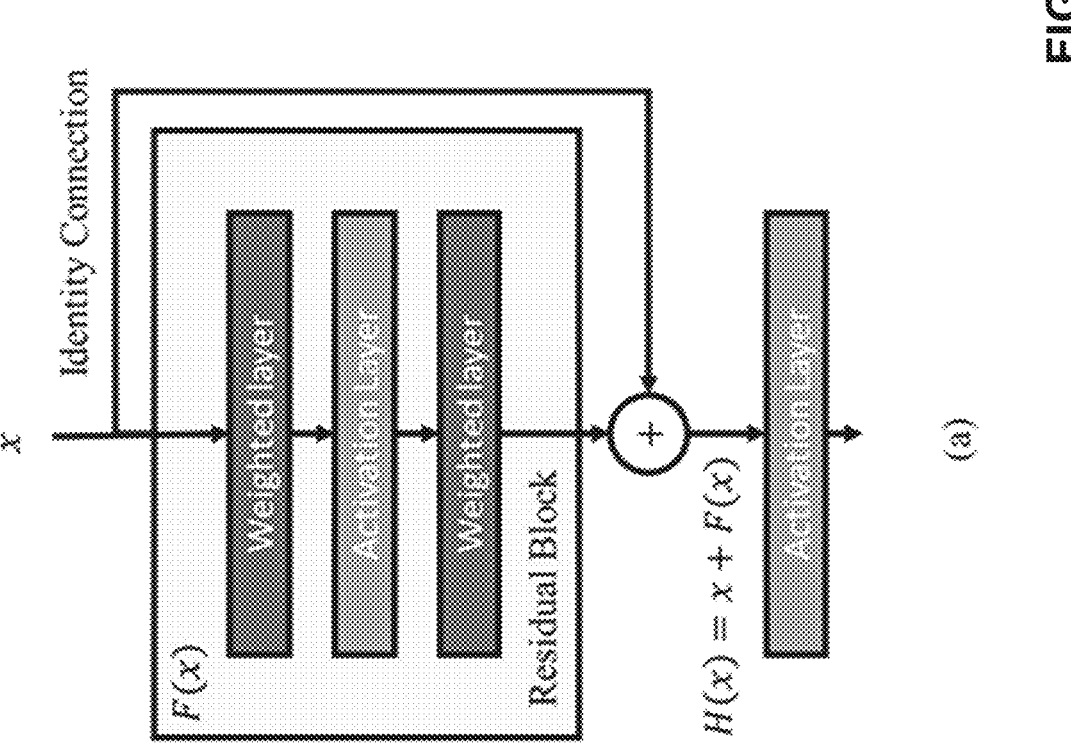
FIG. 7

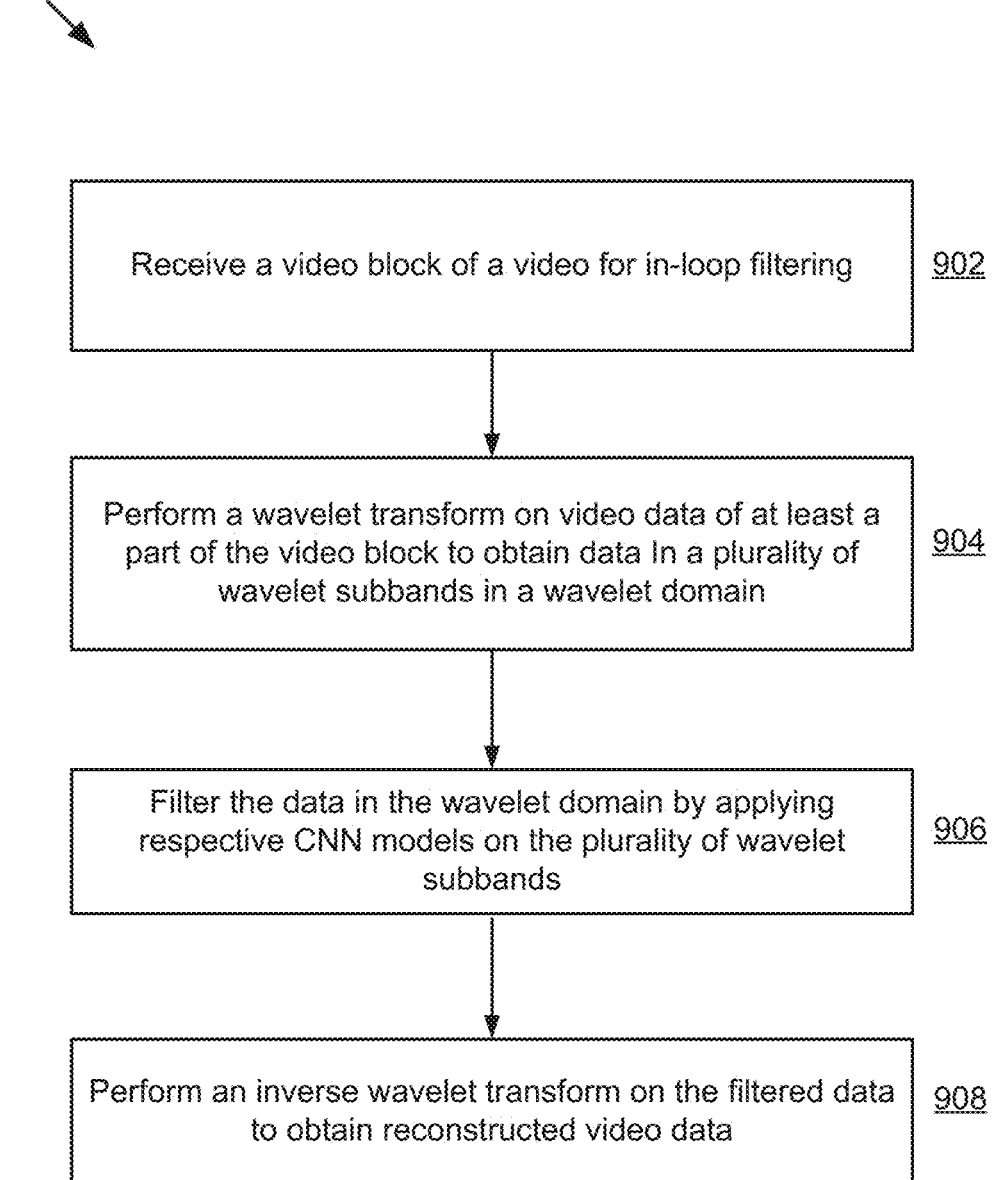

900

| Receive a video block of a video for in-loop filtering | 902 |

| Perform a wavelet transform on video data of at least a part of the video block to obtain data In a plurality of wavelet subbands in a wavelet domain | 904 |

| Filter the data in the wavelet domain by applying respective CNN models on the plurality of wavelet subbands | 906 |

| Perform an inverse wavelet transform on the filtered data to obtain reconstructed video data | 908 |

FIG. 9

1400

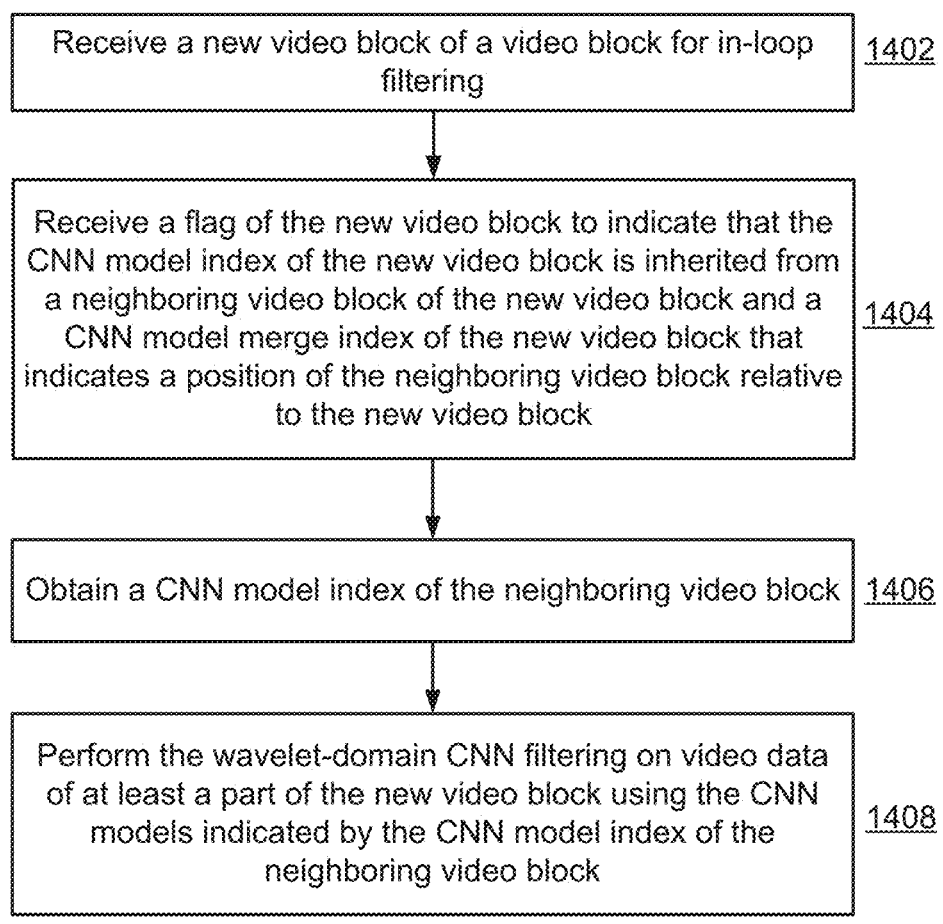

| Receive a new video block of a video block for in-loop filtering | 1402 |

| Receive a flag of the new video block to indicate that the CNN model index of the new video block is inherited from a neighboring video block of the new video block and a CNN model merge index of the new video block that indicates a position of the neighboring video block relative to the new video block | 1404 |

| Obtain a CNN model index of the neighboring video block | 1406 |

| Perform the wavelet-domain CNN filtering on video data of at least a part of the new video block using the CNN models indicated by the CNN model index of the neighboring video block | 1408 |

FIG. 14

| | |
|---|---|
| CTU 1540<br><br>cnnlf_mrg_idx=2 | CTU 1530<br><br>cnnlf_mrg_idx=1 |
| CTU 1520<br><br>cnnlf_mrg_idx=0 | CTU 1510<br><br>current CTU |

Receive training samples    <u>1602</u>

Progressively train CNN models for a plurality of wavelet subbands with the training samples    <u>1604</u>

Jointly train the CNN models with the training samples using the progressively trained CNN models as an initialization    <u>1606</u>

Provide the CNN models for in-loop filtering in video coding    <u>1608</u>

WAVELET TRANSFORM DOMAIN CONVOLUTIONAL NEURAL NETWORK BASED IN-LOOP FILTERING FOR VIDEO CODING

CROSS-REFERENCE TO RELATED APPLICATION

This application is continuation of International Application No. PCT/US2022/036911, filed on Jul. 13, 2022, which is based upon and claims priority to U.S. Provisional Application No. 63/225,982, filed Jul. 27, 2021, both of which are incorporated herein by reference in their entireties.

TECHNICAL FIELD

This application is related to video coding and compression. More specifically, this application relates to video processing apparatuses and methods for Convolutional Neural Network (CNN) filtering in the wavelet-domain.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

On the other hand, deep learning has achieved inspiring advances in the field of artificial intelligence, in the recent several years. As one of the typical neural network architectures, CNN has been widely utilized in the field of computer vision and achieved state-of-the-art performance on a variety of tasks, such as image classification, segmentation and image processing.

SUMMARY

Implementations of the present disclosure provide a video processing method with Convolutional Neural Network (CNN) filtering. The video processing method receives, by a video processor, a video block of a video for in-loop filtering. The method then performs a wavelet-domain CNN filtering on video data of at least a part of the video block, by performing, by the video processor, a wavelet transform on the video data to obtain data in a wavelet domain comprising a plurality of wavelet subbands; filtering, by the video processor, the data in the wavelet domain by applying respective CNN models on the plurality of wavelet subbands, where the CNN models for the plurality of wavelet subbands are trained in the wavelet domain; and performing, by the video processor, an inverse wavelet transform on the filtered data to obtain reconstructed video data.

Implementations of the present disclosure further provide a method for training Convolutional Neural Network (CNN) models to be applied to a video block in a wavelet-domain comprising a plurality of wavelet subbands. The method includes progressively training, by a video processor, the CNN models for the plurality of wavelet subbands, where the CNN models are trained sequentially in a predetermined order of the plurality of wavelet subbands. The method further includes jointly training, by the video processor, the CNN models using the progressively trained CNN models as an initialization. The method also includes providing the CNN models for in-loop filtering of the video block in the wavelet-domain.

Implementations of the present disclosure further provide a non-transitory computer readable storage medium storing a bitstream generated or to be decoded by a method. The method includes receiving, by a video processor, a video block of a video for in-loop filtering. The method also includes performing a wavelet-domain CNN filtering on video data of at least a part of the video block, including: performing, by the video processor, a wavelet transform on the video data to obtain data in a wavelet domain comprising a plurality of wavelet subbands; filtering, by the video processor, the data in the wavelet domain by applying respective CNN models on the plurality of wavelet subbands, where the CNN models for the plurality of wavelet subbands are trained in the wavelet domain; and performing, by the video processor, an inverse wavelet transform on the filtered data to obtain reconstructed video data.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is a graphical illustration of an exemplary fully connected neural network (FCN) and an example convolutional neural network (CNN).

FIG. 7 is a graphical illustration of an exemplary residual block and an exemplary Residual Network (ResNet) with stacking residual blocks.

3

Figure 8:
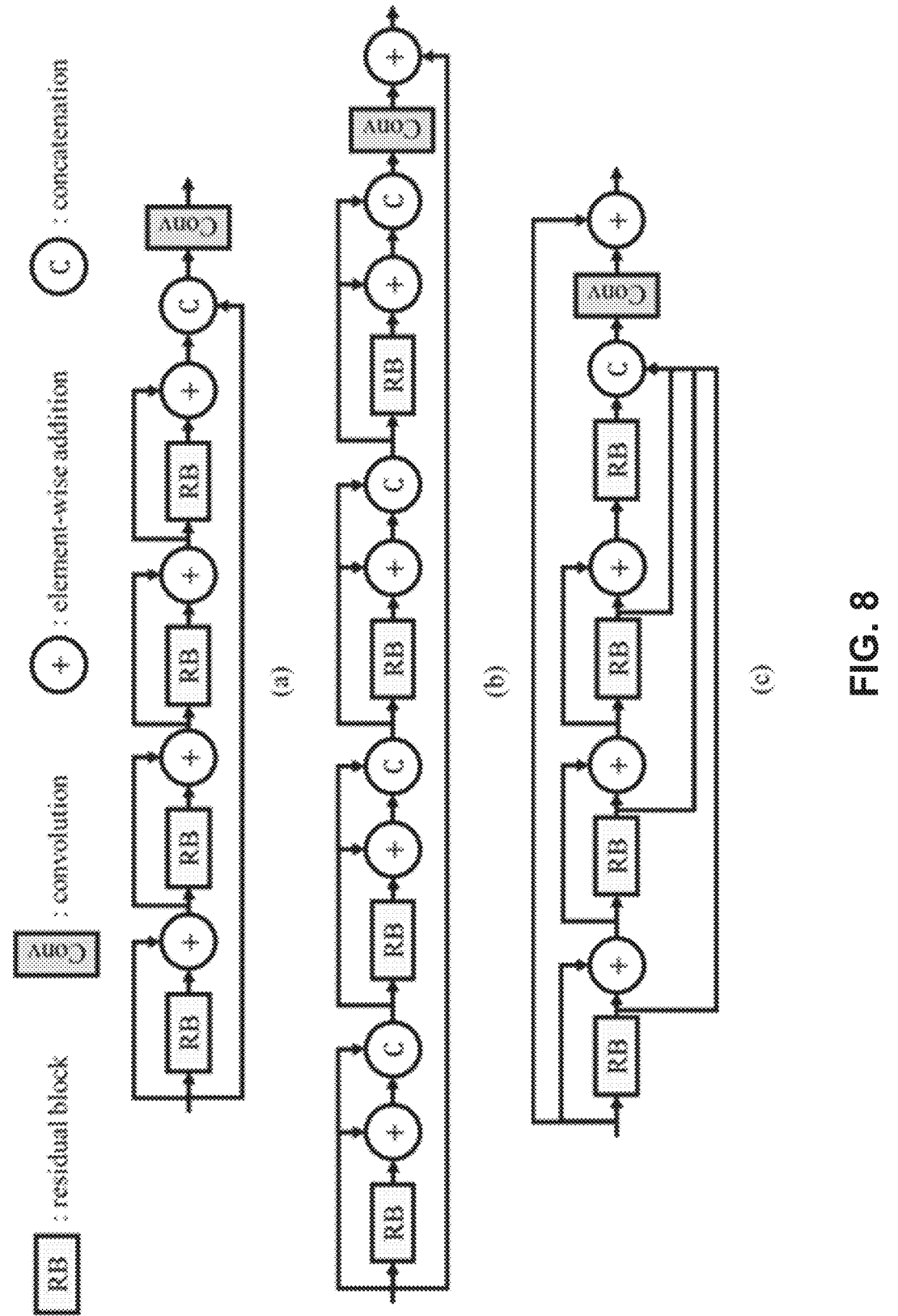

FIG. 8 is a graphical illustration of three exemplary connection architectures of residual blocks in exemplary ResNets.

FIG. 9 is a flow chart of an exemplary method for in-loop filtering with wavelet-domain CNN models, in accordance with some implementations of the present disclosure.

Figure 10:
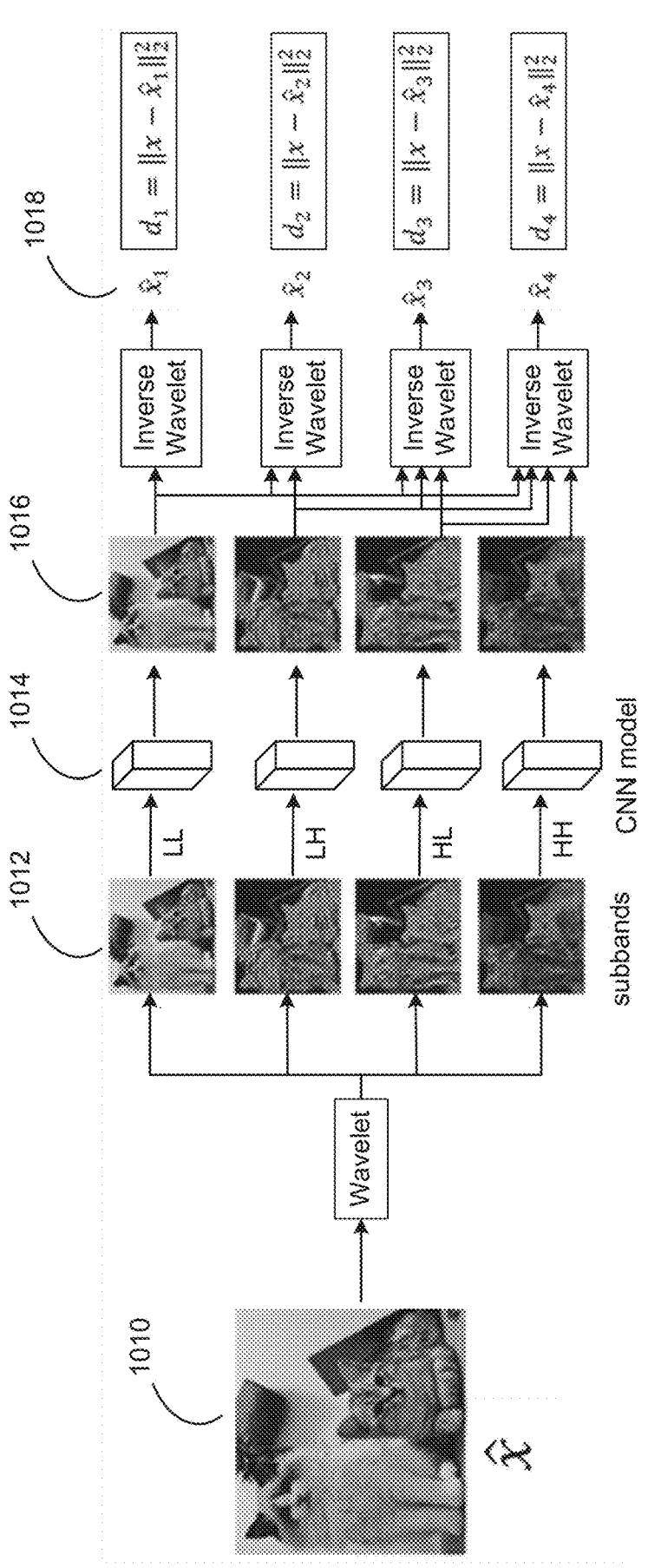

FIG. 10 is an illustration of an exemplary framework for Quantization Parameter (QP)-dependent wavelet-domain CNN in-loop filter, in accordance with some implementations of the present disclosure.

Figure 11:
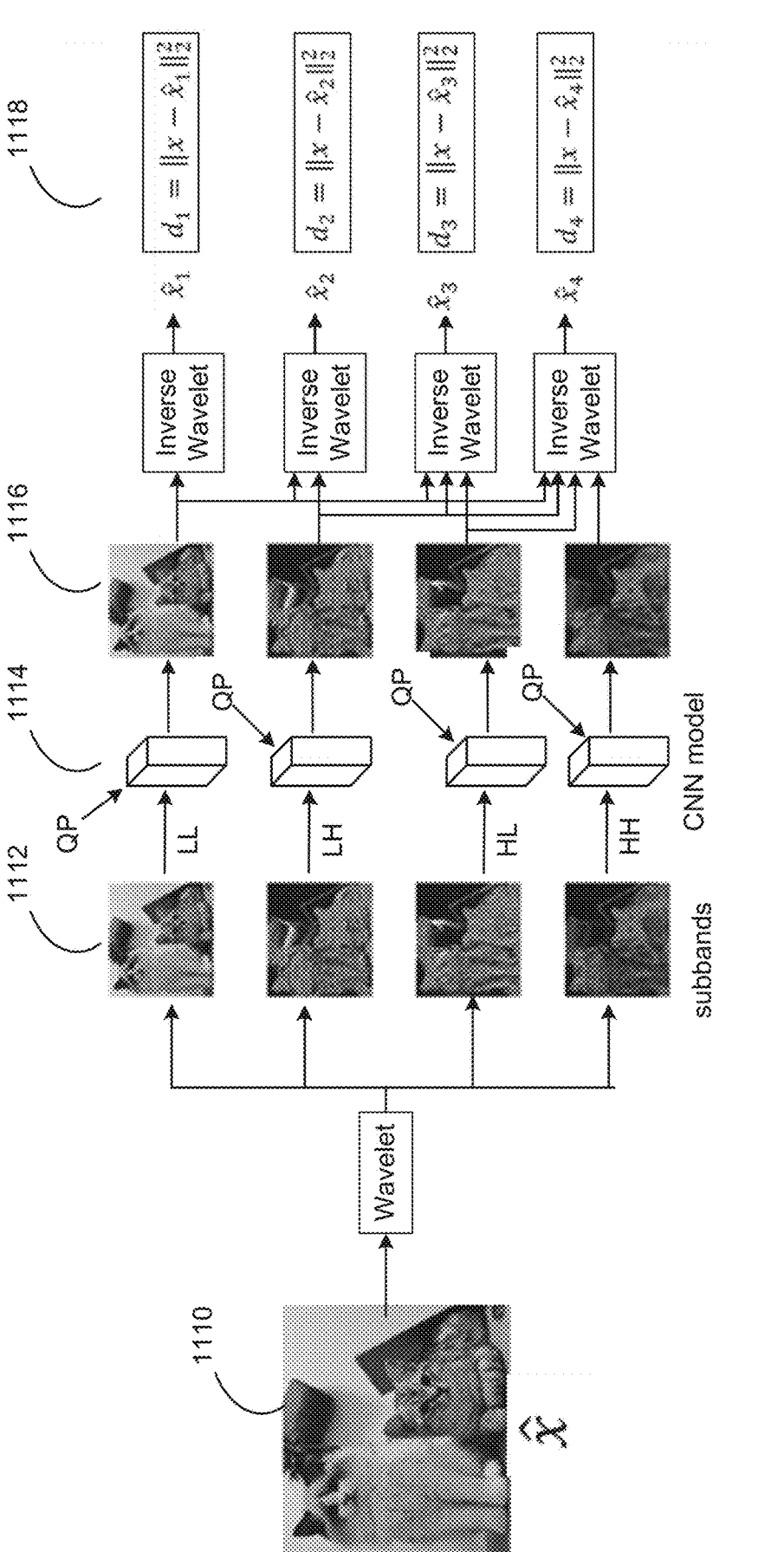

FIG. 11 is an illustration of an exemplary framework for QP-independent wavelet-domain CNN in-loop filter, in accordance with some implementations of the present disclosure.

Figure 12:
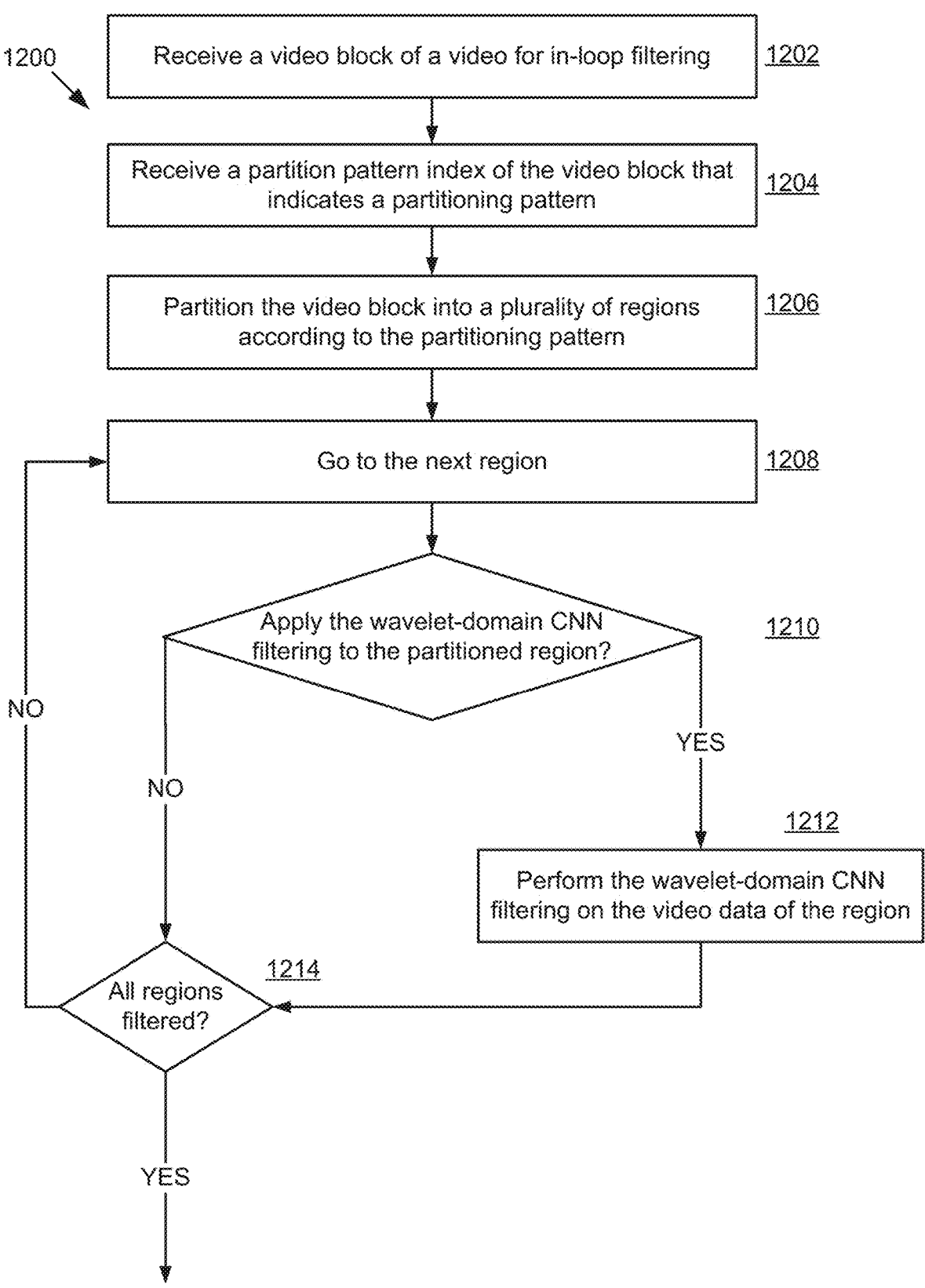

FIG. 12 is a flow chart of an exemplary region-based adaptive CNN-based in-loop filter (CNNLF) switching method, in accordance with some implementations of the present disclosure.

Figure 13:
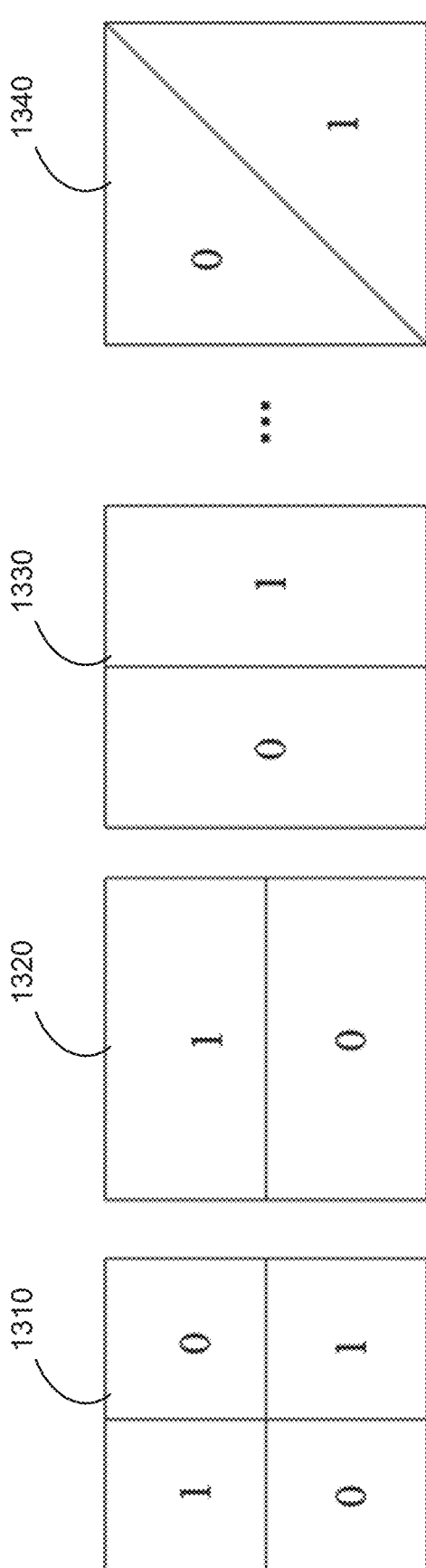

FIG. 13 is a graphical illustration of exemplary partitioning patterns for adaptive CNNLF switching, in accordance with some implementations of the present disclosure.

FIG. 14 is a flow chart of an exemplary CNNLF model index merge method, in accordance with some implementations of the present disclosure.

FIG. 15 is a graphical illustration of exemplary CNNLF model index merge, in accordance with some implementations of the present disclosure.

Figure 16:
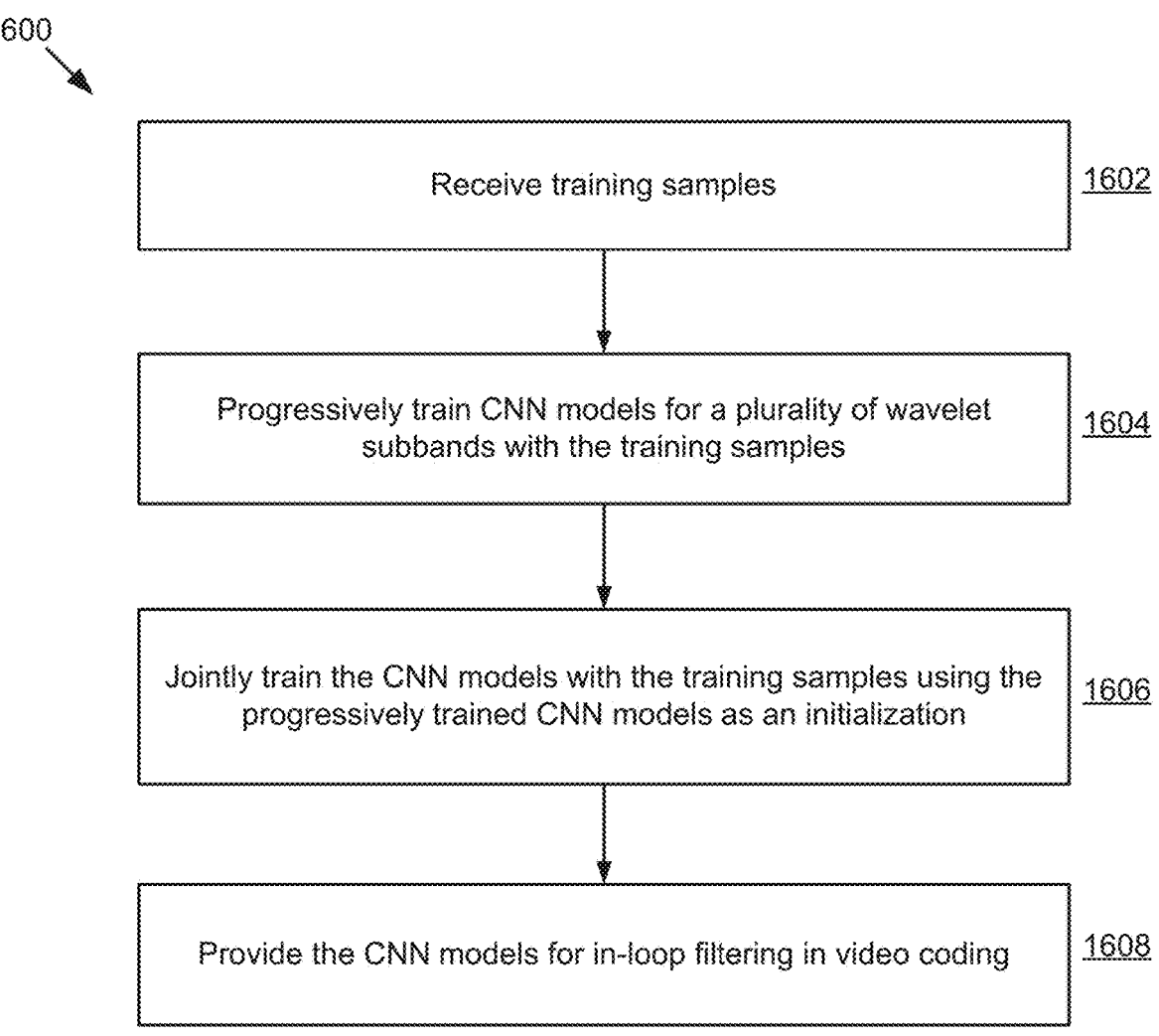

FIG. 16 is a flow chart of an exemplary training method for training CNN models for wavelet-domain CNNLF, in accordance with some implementations of the present disclosure.

Figure 17:
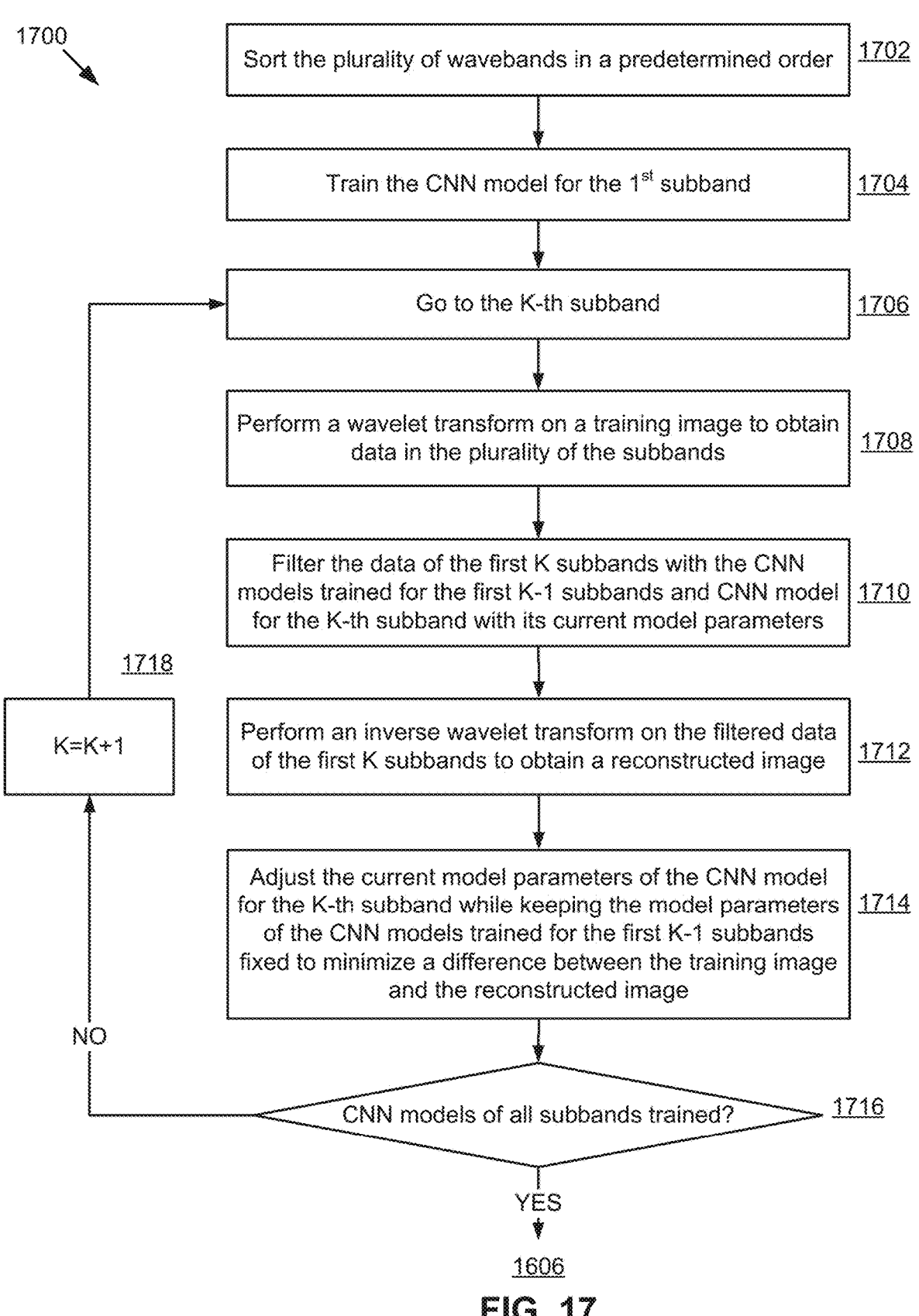

FIG. 17 is a flow chart of an exemplary method for progressively training CNN models for multiple wavelet subbands, in accordance with some implementations of the present disclosure.

Figure 18:
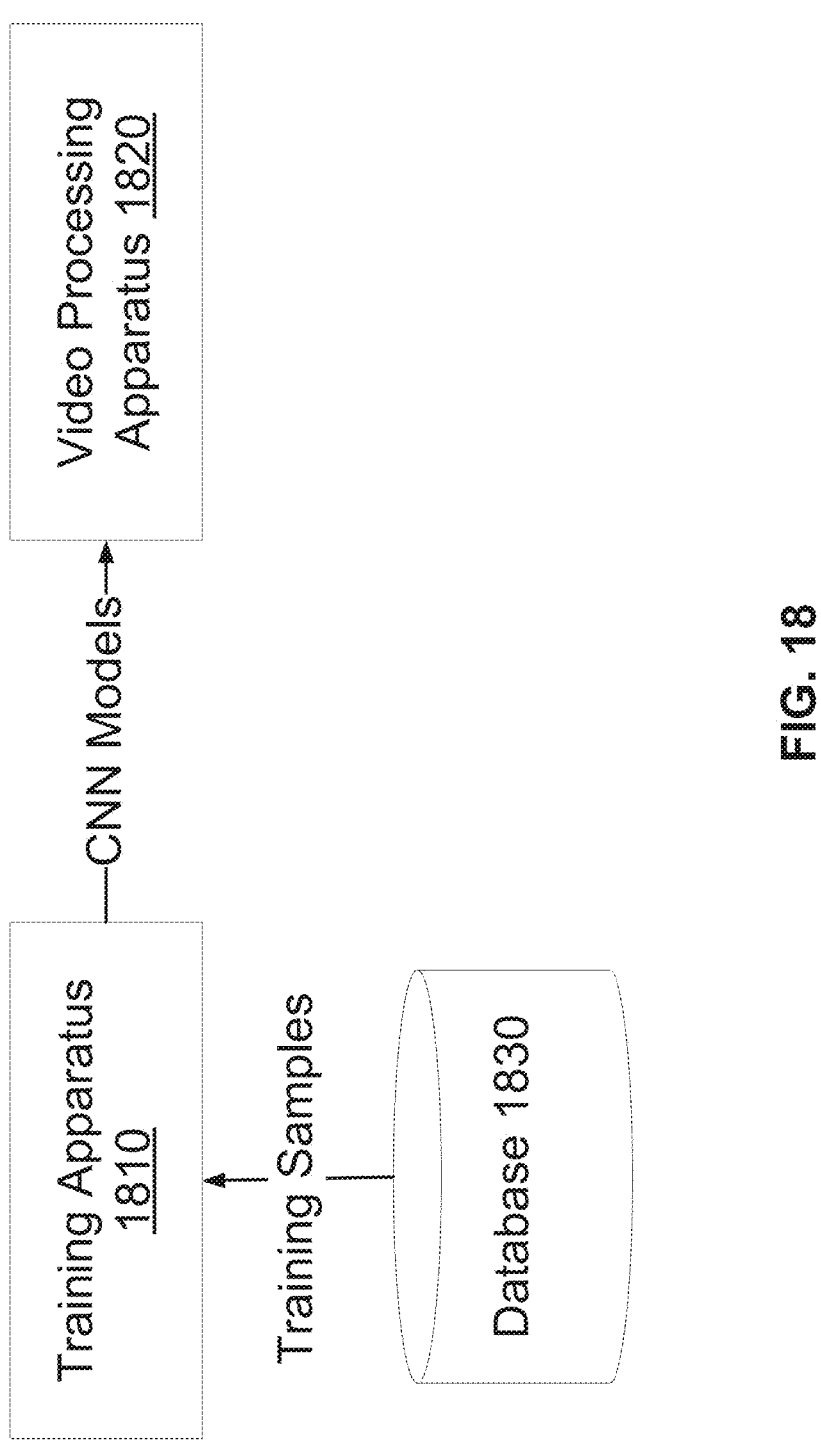

FIG. 18 is a block diagram illustrating a training apparatus and a video processing apparatus, in accordance with some implementations of the present disclosure.

Figure 19:
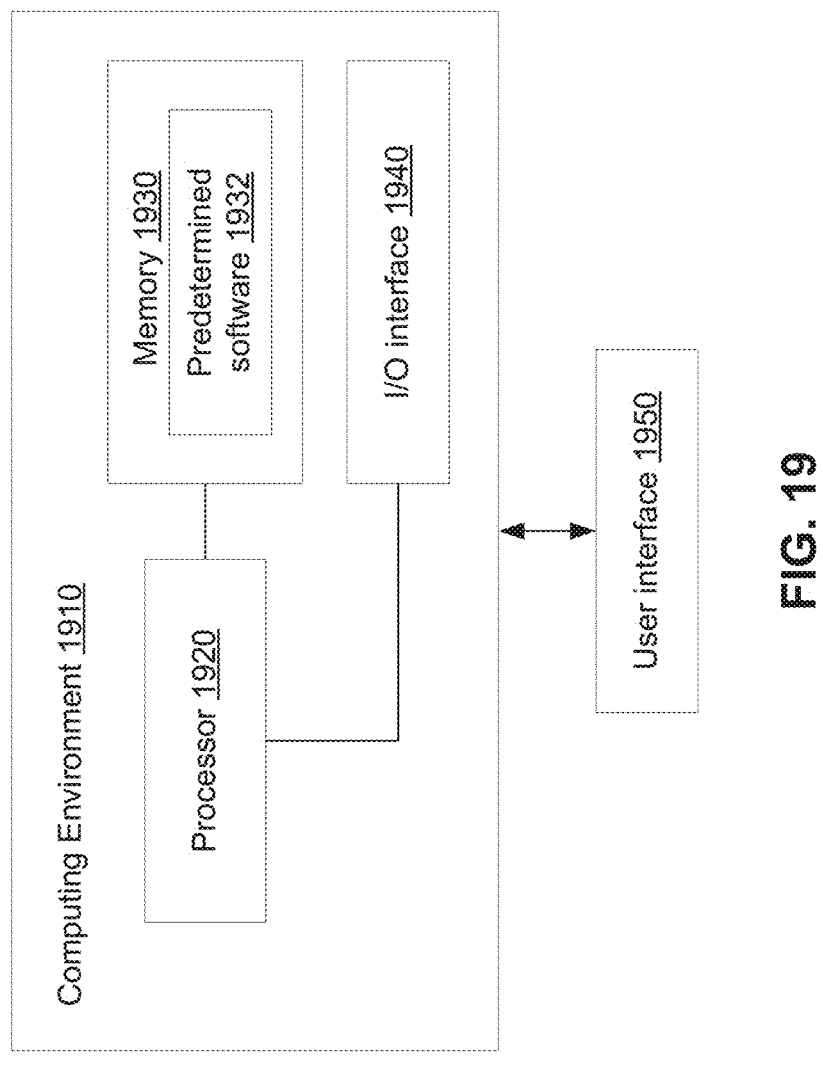

FIG. 19 is a block diagram illustrating a computing environment coupled with a user interface, in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein.

But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

In the current VVC standard and the third-generation audio video coding standard (AVS3), one or more in-loop filtering modules may be present, including a de-blocking filter (DBF), a sample adaptive offset (SAO) filter, and an adaptive loop filter (ALF). CNN is also introduced into video coding firstly as an enhanced in-loop filter, known as CNN-based in-loop filtering (CNNLF), which can achieve significant coding gain. The methods to further improve the performance of CNNLF can be divided into two categories. The first category focuses on the design of more efficient filtering operations, such as more efficient network architecture or advanced training strategy. The second category focuses on the combination of CNNLF with coding information. For example, rate-distortion optimization can be utilized at the encoder side to select optimal CNN models at different levels, including picture level, slice level and block level. In another example, more coding information like QP is incorporated into the CNNLF architecture which can effectively enhance the performance.

However, the current CNNLF methods have the following drawbacks. Firstly, the CNN models are trained blindly through the end-to-end manner, which may be easily stuck in local optimum. Secondly, the blind end-to-end training methods make it difficult to train since it neglects the prior of the image signal. Thirdly, the current CNNLF model switching is conducted at the CTU level which maybe too coarse especially for area with higher variance.

Consistent with the present disclosure, wavelet-domain CNNLF is applied in video coding to improve the coding efficiency. The CNN filtering is conducted in the wavelet transform domain. The training method of the wavelet transform domain CNNLF is described, including the training methods for both QP-dependent model and QP-independent model. In addition, a region-based CNNLF switching method is disclosed to improve the compression efficiency of CNNLF models. Furthermore, a CNNLF model index merge method is also disclosed when multiple model selection is enabled.

Figure 1:
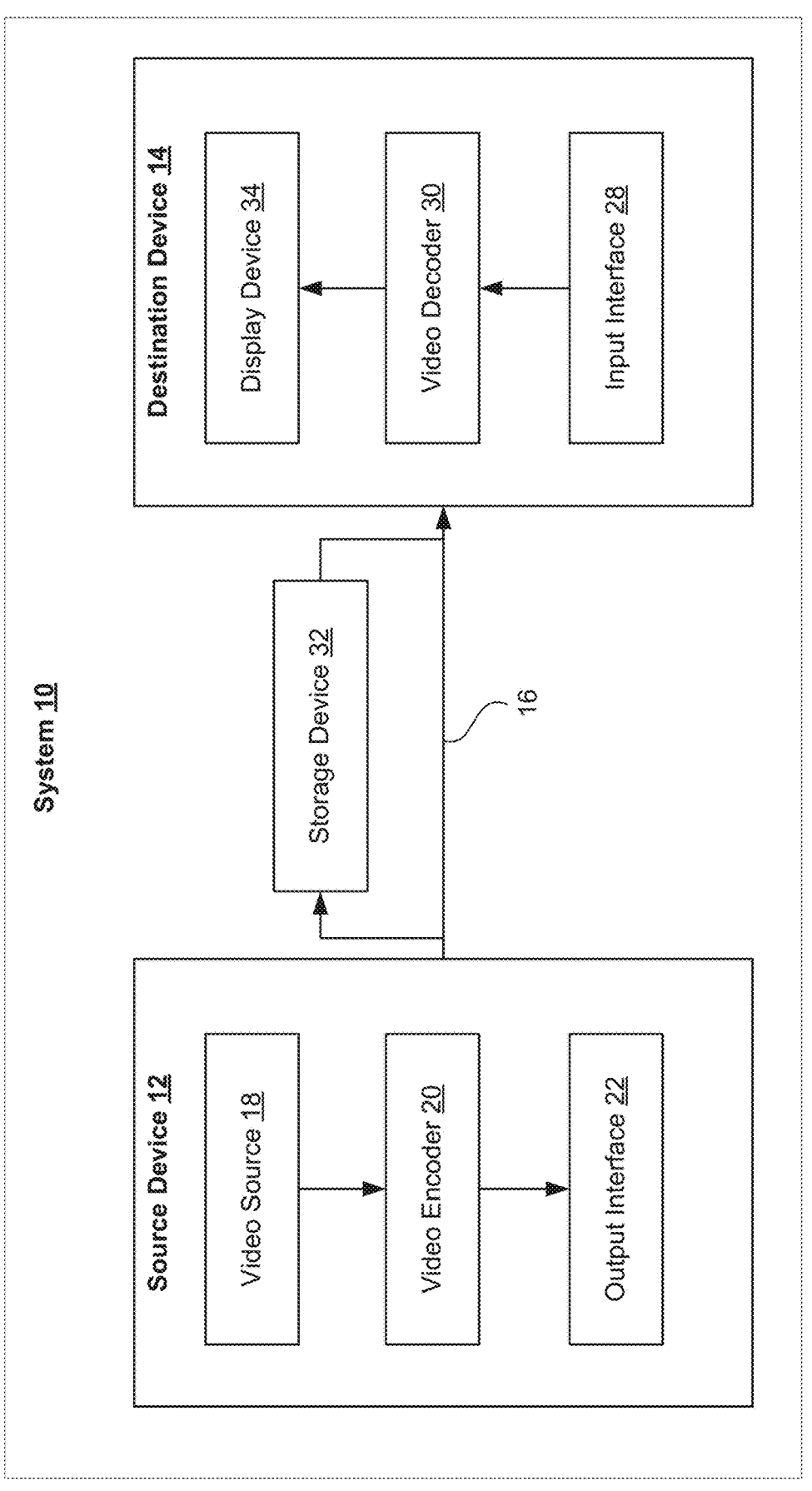
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards. The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
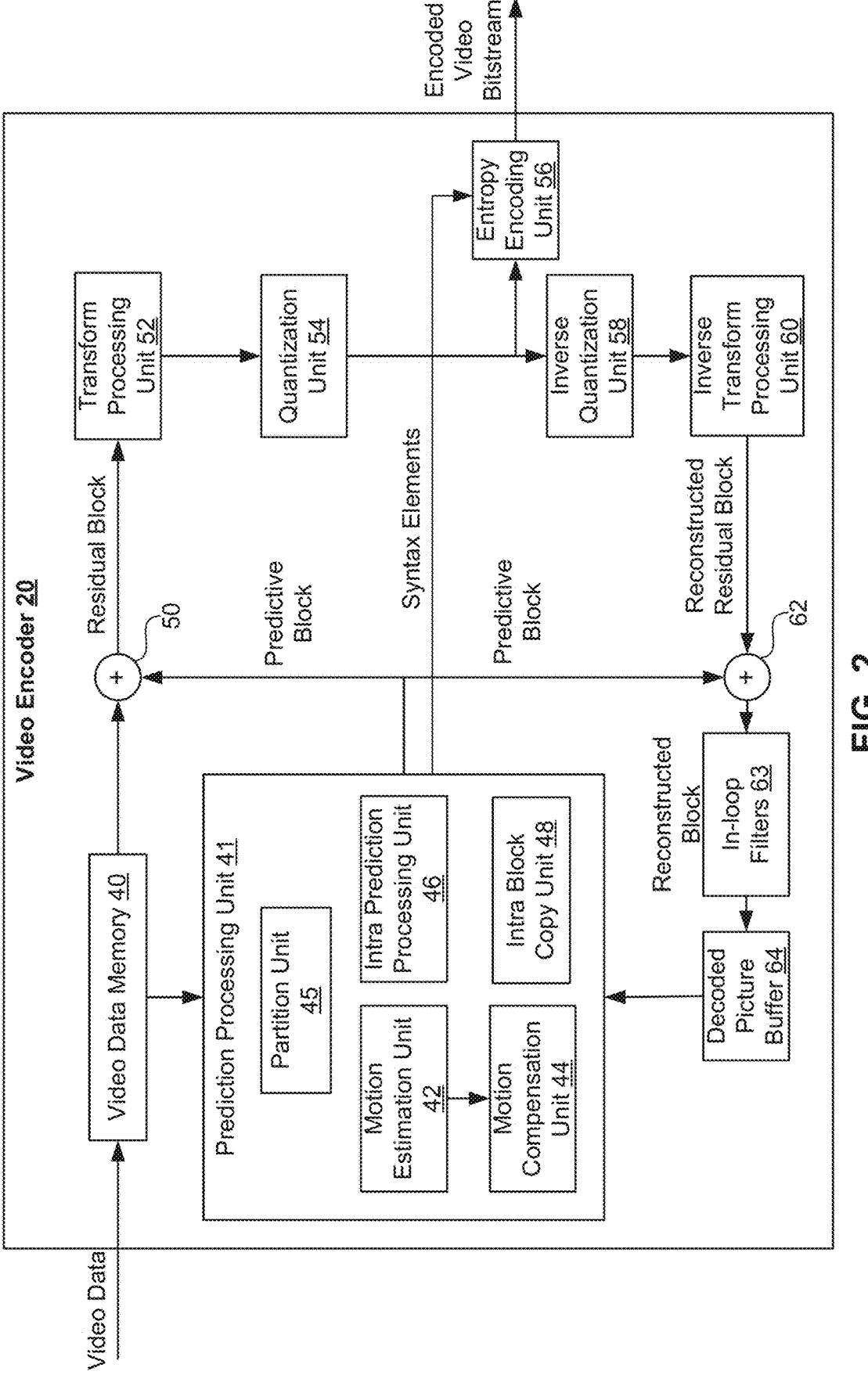
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62.

Consistent with the present disclosure, wavelet-domain CNNLF is implemented by in-loop filter 63. In-loop filter 63 may conduct the CNN filtering in the wavelet transform domain. The CNN models used for the filtering are trained in the wavelet transform domain CNNLF. In some implementations, the CNN models can be QP-dependent or QP-independent. In some implementations, a region-based CNNLF switching method may be further implemented by in-loop filter 63 to improve the compression efficiency of CNNLF models. In some further implementations, a CNNLF model index merge method is also implemented by in-loop filter 63 when multiple model selection is enabled.

In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1 or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
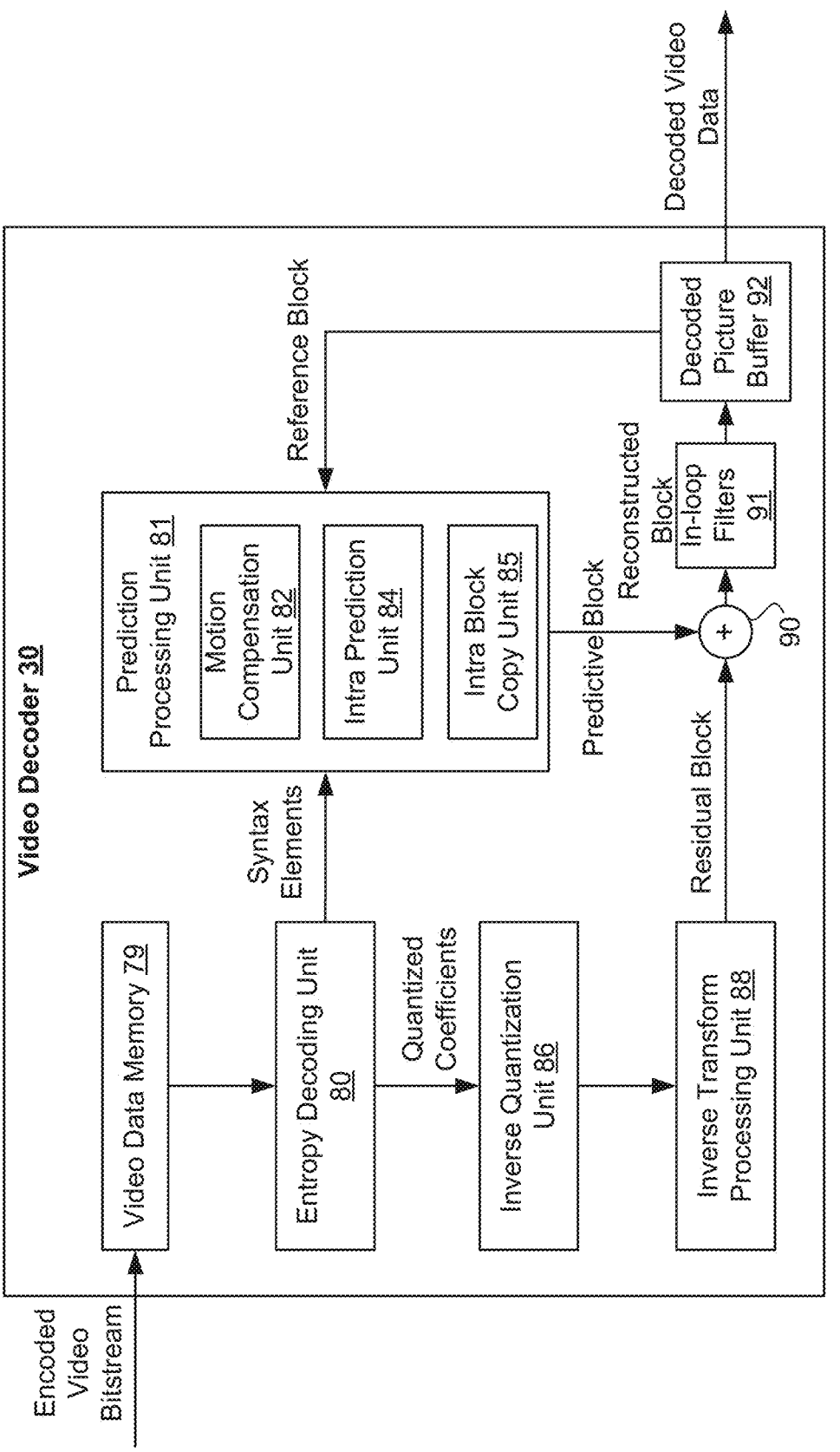
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block.

Consistent with the present disclosure, wavelet-domain CNNLF is implemented by in-loop filter 63 on the encoder side. Accordingly, wavelet-domain CNNLF may be implemented by in-loop filter 91 on the decoder side. In-loop filter 91 may conduct the CNN filtering in the wavelet transform domain. In some implementations, the CNN models used for the filtering are signaled by a CNNLF model index. In some implementations, if a region-based CNNLF switching method is implemented by in-loop filter 63, a partitioning pattern index may be signaled and picked up by in-loop filter 91 or in-loop filter 91 may infer the partitioning pattern through some analysis, such as texture analysis (edge, fore- or background) or coding mode analysis (skip mode or non-skip mode). In some further implementations, if a CNNLF model index merge method is implemented by in-loop filter 63, a CNNLF merge index is signaled for in-loop filter 91 to determine from which neighboring CTU the current CTU inherits the CNNLF model index.

In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
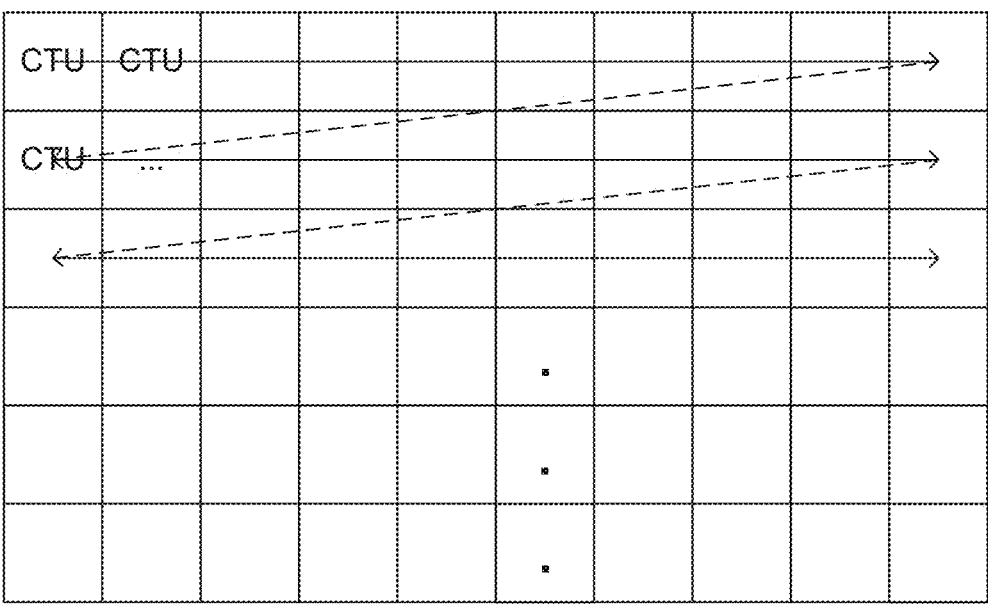
FIGS. 4A through 4E are graphical representations illustrating how a frame is recursively partitioned into multiple video blocks of different sizes and shapes in accordance with some implementations of the present disclosure.
Figure 4B:
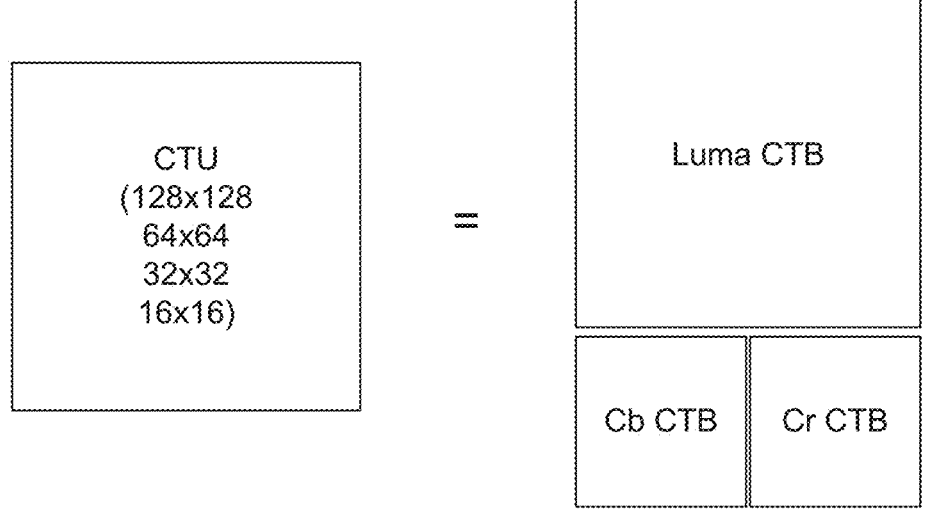

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
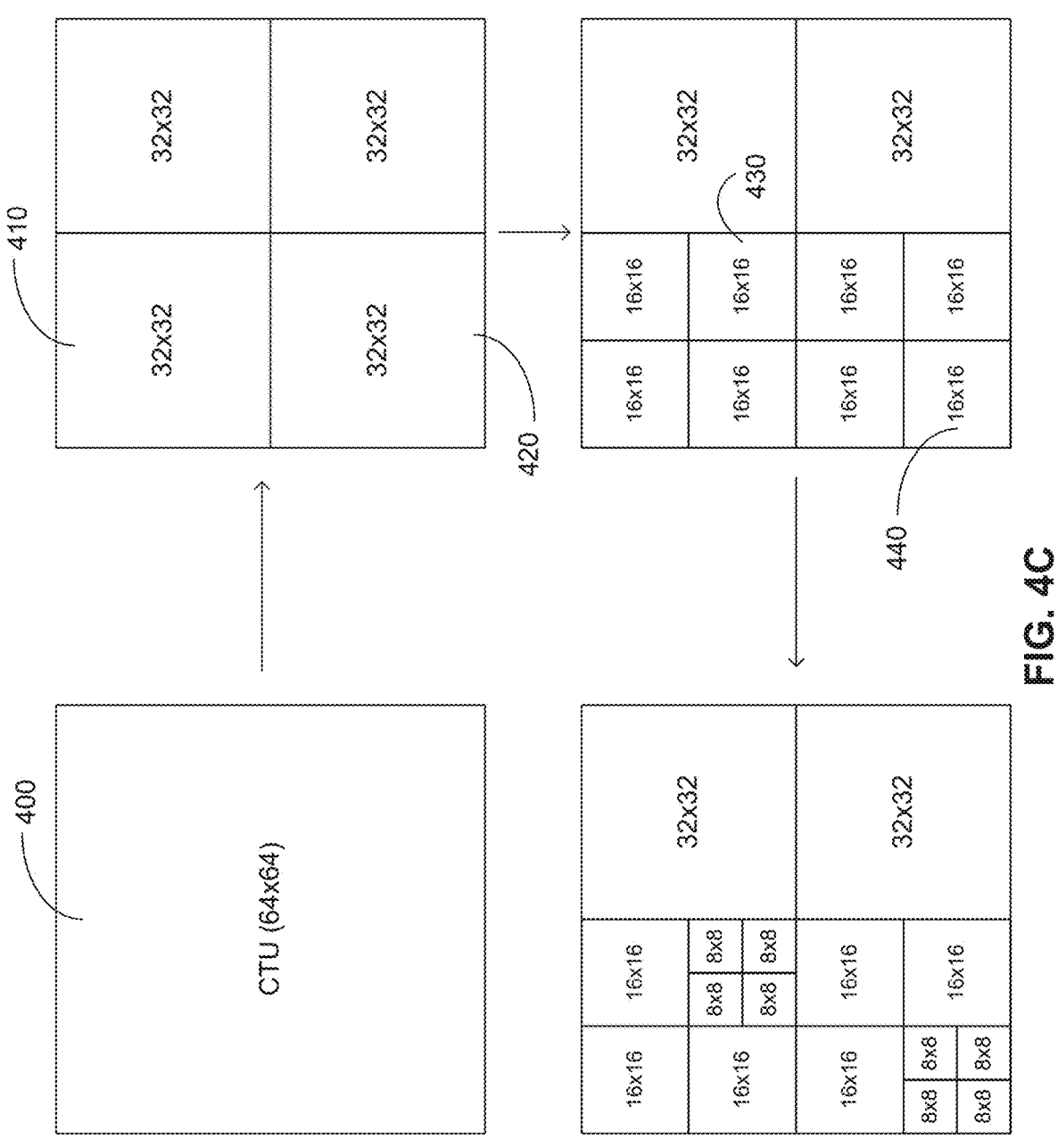
Figure 4D:
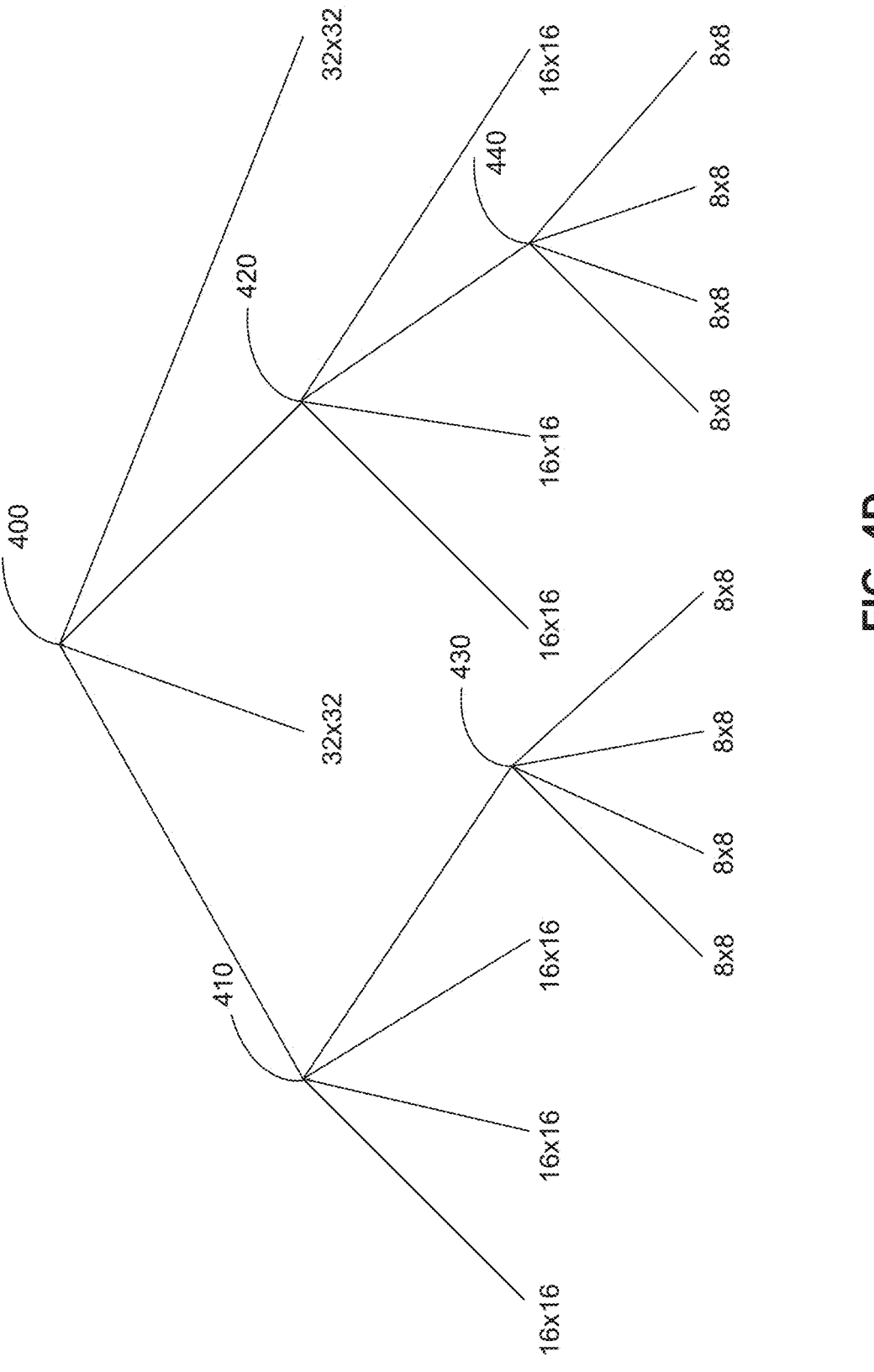
Figure 4E:
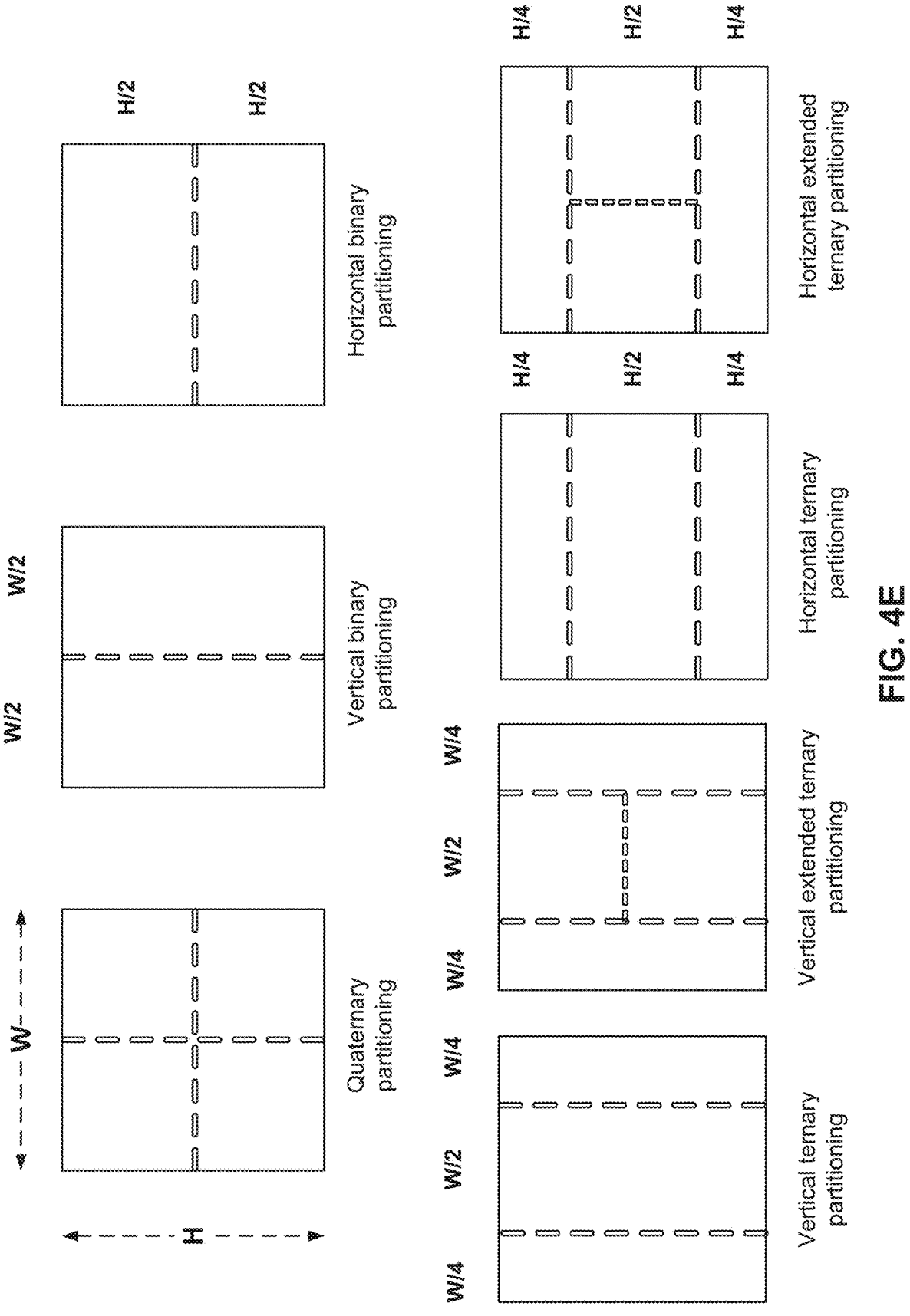

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are multiple possible partitioning types of a coding block having a width W and a height H, i.e., quaternary partitioning, vertical binary partitioning, horizontal binary partitioning, vertical ternary partitioning, vertical extended ternary partitioning, horizontal ternary partitioning, and horizontal extended ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

FIG. 5 is a graphical illustration of an exemplary fully connected neural network (FC-NN) 510 and an example convolutional neural network (CNN) 520. As a popular neural network architecture, CNN 520 (as shown in part (b) of FIG. 5) is very similar to the FC-NN (as shown in part (a) of FIG. 5). FC-NN 510 may include weights and bias matrices. CNN 520 can be seen as a 3-D version of neural network. As shown in part (b) of FIG. 5, CNN 520 includes two hidden layers 522 and 524. Neurons are arranged in 3-Dimensional structure (width, height, and depth) to form second hidden layer 524. In this example, the input layer holds input image or video frames, and therefore its width and height are same as input data. To apply with image or video applications, each neuron in CNN is a spatial filter element with extended depth aligned with its input, e.g., the depth is 3 if there are 3 color components in input images.

Figure 6:
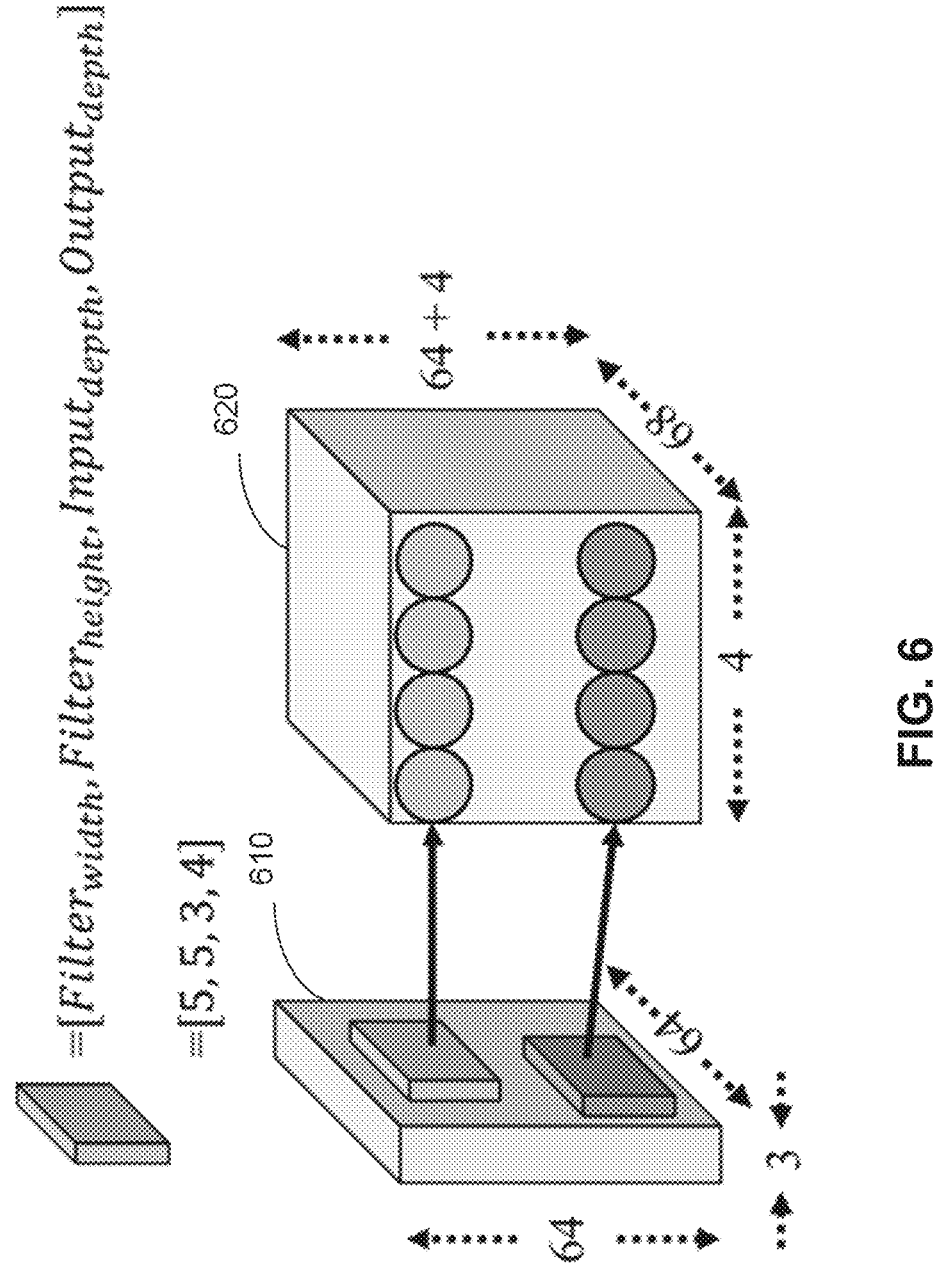
FIG. 6 is a graphical illustration of an exemplary CNN spatial filter.

For example, FIG. 6 is a graphical illustration of an exemplary CNN spatial filter 620 receiving an input image 610. In some implementations, the dimension of basic element in CNN spatial filter 620 is defined as [Filter$_{width}$, Filter$_{height}$, Input$_{depth}$, Output$_{depth}$]. As shown in FIG. 6, the dimension is set to [5, 5, 3, 4] in this example. Each spatial filter performs 2-dimensional spatial convolution with 5*5*3 weights on input image 610, which may be 64*64 in size as shown in FIG. 6. CNN spatial filter 620 outputs 4 convolutional results. Accordingly, the dimension of filtered results is [64+4, 64+4, 4] if padding the boundary with additional 2 pixels.

In image classification, the accuracy degrades and saturates rapidly when the depth of neural network increases. To be more specifically, adding more layers on deep neural network results in higher training error because the gradient is gradually vanishing along the deep network and toward to zero gradient at the end. The Residual Network (ResNet) composed of residual blocks may resolve the degradation problem by introducing the identity connection.

For example, FIG. 7 is a graphical illustration of an exemplary residual block and an exemplary Residual Network (ResNet) with stacking residual blocks. As shown in part (a) of FIG. 7, a basic module of ResNet may include a residual block and an identity connection. According to the universal approximation hypothesizes, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing either additional parameters or computational complexity, the identity connection is proven to make deep learning network trainable by skip one or more non-linear weighted layers as shown in part (a) of FIG. 7. In some implementations, skipping weighted layers, the differential output of the residual layers can be written as Formula (1) below:

$$\frac{\partial H(x)}{\partial x} = \frac{\partial F(x)}{\partial x} + 1 \qquad (1)$$

Accordingly, even if the differential term $$\frac{\partial F(x)}{\partial x}$$

is gradually decreasing toward zero, the identity term can still carry on and pass the input to next layer instead of stuck at zero gradient as well as blocking information propagation. In theory, if a neuron cannot propagate information to next neuron, it is seen as dead neuron, which is non-trainable element in neural network. After addition, another non-linear activation function can be applied as well.

Part (b) of FIG. 7 provides an example of ResNet by stacking residual modules. As shown in the drawing, the residual features are fused with the identity features before propagating to the next module. Several variants of ResNet may improve the recovered image quality for single image super-resolution (SISR) and increase the accuracy for image classification. FIG. 8 is a graphical illustration of three exemplary connection architectures of residual blocks in exemplary ResNets.

For example, as shown in part (a) of FIG. 8, a global identity connection may be applied from the input of first residual block to the output of last residual block in order to facilitate the convergence of training procedure. This ResNet variant can enhance the visual quality of the up-sampled images.

Another example shown in part (b) of FIG. 8 stacks multiple residual blocks in order to further improve the video coding efficiency. Each residual block directly propagates its own input to the following unit by concatenation operation. In other words, each intermediate block can receive multi-hierarchical information from its preceding units because multi-level information can flow through the identical connection. The parameter of each residual block in part (b) of FIG. 8 is linearly increased with the number of layers because the concatenation operation. In both parts (a) and (b), before the residual information can be propagated to later module, the residual features have to go through one or several modules. Due to identity connection, these residual features can be rapidly coupled with identity features at certain layer and stop propagating to succeeding module. Therefore, the residual features in these two variations are limited locally and results in performance degradation.

Part (c) of FIG. 8 shows yet another variation of ResNet, which tackles SISR by aggregate the output of residual blocks. In this variation, the output of the last residual block is concatenated with all the output of previous three modules. Before applied with element-wise addition with the input of first residual block, the concatenated hierarchical features are fused by convolutional operation. Different from the first two variations in parts (a) and (b), aggregated ResNet makes non-local features applicable to the last residual module so that the hierarchical information can be propagated to succeeding blocks, achieving the feature representation in a more discriminative way.

Consistent with the present disclosure, CNN-based in-loop filtering is improved by applying the CNN filtering in a wavelet transform domain. The wavelet-domain CNNLF addresses several problems of the existing CNNLF methods. For example, unlike the existing CNN models that are trained blindly through the end-to-end manner, which may be easily stuck in local optimum and difficult to train because they neglect the prior of the image signal, the disclosed wavelet-domain CNN models are first trained progressively throughout the wavelet subbands and then jointly. The disclosed training methods apply to both QP-dependent model and QP-independent model.

FIG. 9 is a flow chart of an exemplary method 900 for in-loop filtering with wavelet-domain CNN models, in accordance with some implementations of the present disclosure. Method 900 may be implemented by a video processor associated with video encoder 20 or video decoder 30, and may include steps 902-908 as described below. Some of the steps may be optional to perform the disclosure provided herein. Further, some of the steps may be performed simultaneously, or in a different order than shown in FIG. 9. Method 900 may utilize frameworks such as those shown in FIGS. 10 and 11. For example, FIG. 10 is an illustration of an exemplary framework for Quantization Parameter (QP)-dependent wavelet-domain CNN in-loop filter, in accordance with some implementations of the present disclosure. Alternatively, FIG. 11 is an illustration of an exemplary framework for QP-independent wavelet-domain CNN in-loop filter, in accordance with some implementations of the present disclosure. FIGS. 9-11 will be described together.

In step 902, the video processor may receive a video block of a video for in-loop filtering. In some implementations, the video block may be a CTU or a video block of another level. The video block contains video data to be coded by in-loop filtering. Because a video block is part of a video frame, a two-dimensional image, the video data of the video block may also be referred to in this disclosure as image data. For example, FIGS. 10 and 11 show exemplary decompressed video blocks 1010 and 1110 received for in-loop filtering.

In step 904, the video processor may perform a wavelet transform on video data of at least a part of the video block to obtain data in a plurality of wavelet subbands in a wavelet domain. The forward wavelet transform decomposes the decompressed image into the several subbands which have different frequencies and orientations. In some implementations, the wavelet transform may be performed on decompressed image data. For example, data can be obtained for N subbands by performing forward wavelet transform on the decompressed image according to Formula (2):

$$\hat{B}_1, \hat{B}_2, \ldots, \hat{B}_N = F(\hat{x}) \qquad (2)$$

where $\hat{x}$ is the decompressed image, $\hat{B}_1, \hat{B}_2, \ldots, \hat{B}_N$ are data in the N subbands and F represents the forward wavelet transform. As shown in FIGS. 10 and 11, after the forward wavelet transformation, decompressed video blocks 1010 and 1110 become a series of wavelet images 1012 and 1112 for the respective subbands. For example, the subbands may include LL, LH, HL, and HH subbands.

In some alternative implementations, the waveform transform may be performed on the original image x. For example, data can be obtained for the N subbands by performing forward wavelet transform on the original image according to Formula (3):

$$B_1, B_2, \ldots, B_N = F(x) \qquad (3)$$

where $B_1$, $B_2$, . . . , $B_N$ are data in the N subbands of the original image x and F represents the forward wavelet transform.

In step 906, the video processor may filter the data in the wavelet domain by applying respective CNN models on the plurality of wavelet subbands. One CNN model is trained for each subband. Therefore, if there are N subbands, N CNN models are applied to those respective subbands.

In some implementations, the CNN models may be QP-dependent. QP-dependent CNN models may be trained using training samples collected for a specific QP and applied to filter video data corresponding to that QP. When the video data corresponds to multiple QPs, the data can be first sorted according to QPs, and then separately filtered by CNN models trained for the respective different QPs. FIG. 10 shows the use of QP-dependent CNN models 1014 to wavelet images 1012 to obtain filtered data 1016 in the respective subbands.

In some alternatively implementations, the CNN models may be QP-independent. QP-independent CNN models may be trained using training samples collected for mixed QPs. FIG. 11 shows the use of QP-independent CNN models 1114 to wavelet images 1112 to obtain filtered data 1116 in the respective subbands.

The training methods for training both the QP-dependent CNN models and QP-independent CNN models will be described in detail later in connection with FIGS. 16-17.

In step 908, the video processor may perform an inverse wavelet transform on the filtered data to obtain reconstructed video data. Inverse wavelet transform is an inverse process of the forward wavelet transform, which reconstructs the image data from the data of wavelet subbands. For example, the reconstructed image data $\tilde{x}_K$ can be obtained through inverse wavelet transforming the filtered data $\tilde{B}_1, \tilde{B}_2, \ldots, \tilde{B}_N$ in the N subbands according to formula (4):

$$\tilde{x}_K = G(\tilde{B}_1, \tilde{B}_2, \ldots, \tilde{B}_N) = G(R_1(\tilde{B}_1), R_2(\tilde{B}_2), \ldots, R_N(\tilde{B}_N)) \qquad (4)$$

where $R_i$ represents the CNN model for the i-th subband, G represents the inverse wavelet transform, and $\hat{B}_1, \hat{B}_2, \ldots, \hat{B}_N$ are data in the N subbands. As shown in FIGS. 10 and 11, reconstructed images 1018 and 1118 are obtained after applying the inverse wavelet transform on filtered data 1016 and 1116 of the various subbands.

Another problem of the existing CNNLF methods lie in the way model switching is conducted. In the current coding strategy of CNNLF, slice level and CTU level switching are utilized. For each slice, a flag is signaled to decide whether CNNLF is applied. For each CTU, a flag is signaled to decide whether CNNLF is applied. If this flag is true, then a cnnlf_model_idx can be signaled to indicate which CNN model is utilized for the CTU. CNNLF switching can effectively improve the performance of CNNLF especially the multiple models switching. However, the video content is diverse and the content of the different regions in a CTU may vary a lot. Besides, the maximum size of CTU increase a lot in VVC compared with HEVC, making the content more nonstationary. Therefore, CTU level CNNLF switching may be too coarse to capture the nonstationary video content.

Consistent with the present disclosure, a region-based CNNLF switching method is used to improve the compression efficiency of CNNLF models. In this method, CTU may be firstly partitioned into several regions. Then CNNLF switching may be conducted for each region. For example, for each region a flag is signaled to indicate whether CNNLF is enabled. If CNNLF is enabled in the region, then the cnnlf_model_idx is signaled to indicate which CNN model is utilized for this region.

FIG. 12 is a flow chart of an exemplary region-based adaptive CNN-based in-loop filter (CNNLF) switching method 1200, in accordance with some implementations of the present disclosure. Method 1200 may be implemented by a video processor associated with video decoder 30, and may include steps 1202-1214 as described below. Some of the steps may be optional to perform the disclosure provided herein. Further, some of the steps may be performed simultaneously, or in a different order than shown in FIG. 12.

In step 1202, the video processor may receive a video block of a video for in-loop filtering, similar to step 902.

In step 1204, partition_pattern_idx may be received, which indicates a partitioning pattern applied for the video block. In some implementations, several partitioning patterns are defined. For example, FIG. 13 provides several examples of the partitioning pattern. These partitioning patterns include quadtree partitioning 1310, binary tree partitioning 1320 and 1330, and diagonal partitioning 1340. It is contemplated that any other partitioning patterns are also applicable. At the encoder side, rate distortion optimization may be used to select the optimal partitioning pattern.

In some other implementations, the partitioning pattern can be inferred at the decoder side through some analysis, such as texture analysis (edge, fore- or background) or coding mode analysis (skip mode or non-skip mode). In this case, the partition_pattern_idx is not needed and the partitioning can be more flexible compared with the explicit method, and therefore, step 1204 may be omitted.

In step 1206, the video processor may partition the video block into a plurality of regions according to the partitioning pattern.

Method 1200 then performs CNNLF model switching for each region in loops by performing steps 1208-1220. Before each loop, in step 1208, method 1200 goes to the next partitioned region, and the loop for each partitioned region ends after step 1220.

In step 1210, the video processor determines whether to apply the wavelet-domain CNN filtering to the current partitioned region. In some embodiments, the determination may be based on a flag of the partitioned region that indicates that the wavelet-domain CNN filtering is applied to the partitioned region. The video processor may receive that flag in the bitstream along with the video block. In some embodiments, the video processor may further receive a CNN model index of the partitioned region to indicate the CNN models used for the partitioned region. For example, if multiple CNN models switching is enabled in the region, then the cnnlf_model_idx is signaled to indicate which CNN model is utilized for this region. If it determines to apply the wavelet-domain CNN filtering (step 1210:Yes), the video processor may perform the wavelet-domain CNN filtering on the video data of the partitioned region, in step 1212. Specifically, the video processor may perform method 900 described above in connection with FIG. 9 to implement step 1212. After step 1212, method 1200 may proceed to step 1214.

If it determines not to apply the wavelet-domain CNNLF (step 1210:No), method 1200 may proceed to step 1214 directly without performing step 1212.

In step 1214, the video processor checks whether all portioned regions of the video block are switched.

If so (step 1214: Yes), method 1200 may conclude, and otherwise (step 1214: No), method 1200 returns to step 1208 to start another loop of steps 1208-1214 for the next partitioned region.

Another drawback of the existing CNN models switching methods is the way the CNNLF model index (cnnlf_model_idx) is signaled. In the current methods, a CNNLF model index (cnnlf_model_idx) is signaled for each CTU. That is necessary when the statistical property of one CTU is different from its neighboring CTU, because their cnnlf_model_idx may be different. However, when the statistical property of one CTU is similar to its neighboring CTU, they may share the same cnnlf_model_idx. In that case, signaling the CNNLF model index for both CTUs may be redundant.

Consistent with the present disclosure, a CNNLF model index merge method is performed when multiple model selection is enabled. Using CNNLF model index merge, the cnnlf_model_idx of the current CTU can be inherited from its neighboring one, similar to the motion information merge mode. In some implementations, CNNLF model merge is controlled at SPS. When CNNLF model merge is enabled, for each CTU, a cnnlf_merge_flag may be signaled to indicate whether CNNLF merge is utilized. If cnnlf_merge_flag is true, then another cnnlf_merge_idx may be signaled to indicate where to inherit the cnnlf_merge_idx.

FIG. 14 is a flow chart of an exemplary CNNLF model index merge method 1400, in accordance with some implementations of the present disclosure. Method 1400 may be implemented by a video processor associated with video decoder 30, and may include steps 1402-1408 as described below. In some implementations, method 900 may be performed first to process a video block and method 1400 may be subsequently performed on a new video block neighboring the video block processed by method 900. Some of the steps may be optional to perform the disclosure provided herein. Further, some of the steps may be performed simultaneously, or in a different order than shown in FIG. 14.

In step 1402, the video processor may receive a new video block for in-loop filtering.

In step 1404, the video processor may receive a flag of the new video block to indicate that the CNN model index of the video block is inherited from a neighboring video block of the new video block. The neighboring video block may be previously processed using method 900. A neighboring video block may be a video block bordering or connecting with the new video block. Due to the continuous nature of the video data within the video frames, the statistical property of the neighboring video blocks may be similar to each other. Inheriting the CNN model index saves bits for the new block to separately and repetitively signal the CNN models used for in-loop filtering. Therefore, CNNLF model index merge may be beneficial to implement.

FIG. 15 is a graphical illustration of exemplary CNNLF model index merge, in accordance with some implementations of the present disclosure. FIG. 15 shows that for the current CTU 1510 (the received new video block), it can inherit the CNNLF model from CTU 1520 to its left, CTU 1530 on its above or CTU 1540 on the left-above. Because the video blocks in a video frame are typically processed from left to right and from top to bottom, so the left, above or the left-above video block is processed prior to the current video block.

As part of step 1404, the video processor may further receive a CNN model merge index of the new video block to indicate a position of the neighboring video block relative to the new video block. For example, as shown in FIG. 15, if the CNN model index is inherited from CTU 1520, the corresponding cnnlf_merge_idx is 0. If the CNN model index is inherited from CTU 1530, the corresponding cnnlf_merge_idx is 1. If the CNN model index is inherited from CTU 1540, the corresponding cnnlf_merge_idx is 2. In some implementations, to save the bits to signal the cnnlf_merge_idx, the cnnlf_model_idx may be directly inherited from the left video block (e.g., CTU 1520 in FIG. 15), in which case the CNN model merge index needs not signaled. Also, because CTU 1520 is the video block processed immediately before CTU 1510, this implementation may be also more friendly to hardware implementation.

In step 1406, the video block may obtain a CNN model index of the neighboring video block. In some implementations, after performing method 900, the video processor may signal a CNN model index for the video block to indicate the CNN models applied to the video block for CNNLF. For example, a cnnlf_model_idx index may be signaled. The new video block may inherit the CNN model index from the neighboring video block and use the same CNN models signaled in this CNN model index.

In step 1408, the video processor may perform the wavelet-domain CNN filtering on video data of at least a part of the new video block using the CNN models indicated by the CNN model index. Specifically, the video processor may perform method 900 described above in connection with FIG. 9 to implement step 1408.

As described above, different from previous CNN-based in-loop filtering methods, which train the CNN filter directly through an end-to-end manner, the disclosed wavelet-domain CNNLF method in this disclosure conducts filtering on the transform domain. More specifically, the CNN filtering operations are performed on the wavelet subbands. For each subband, a corresponding CNN model is applied. The final target is to minimize the distance between the reconstructed image and the original image. Because wavelet transform has a progressive reconstruction property, a low-quality image can be reconstructed by using only a fraction of the subbands. The progressive reconstruction property can be the basis of scalability of wavelet transform. Based on this property, a progressive training method is disclosed to train the wavelet domain CNNLF, which can be divided into two parts, including (1) a step-by-step training stage where the CNN models for the respective subbands are progressively and sequentially trained and (2) a joint training stage where the CNN models are jointly trained using the trained CNN models in stage (1) as initialization.

FIG. 16 is a flow chart of an exemplary training method 1600 for training CNN models for wavelet-domain CNNLF, in accordance with some implementations of the present disclosure. Method 1600 may be implemented by a video processor associated with a model training apparatus (e.g., training apparatus 1810 of FIG. 18), and may include steps 1602-1608 as described below. Some of the steps may be optional to perform the disclosure provided herein. Further, some of the steps may be performed simultaneously, or in a different order than shown in FIG. 16.

In step 1602, the video processor of the training system may receive training samples. The training samples may include training images, in the form of decompressed images or original images. In some implementations, the training samples may be collected for a specific QP, and accordingly method 1600 is performed to train QP-dependent CNN models, that can be later applied to filter images of that QP. In some alternative implementations, the training samples may include mixed samples of different QPs, and accordingly method 1600 can be adapted to train QP-independent CNN models.

In step 1604, the video processor may progressively train CNN models for a plurality of wavelet subbands with the training samples. The step-by-step stage is carried out in step 1604. For the convenience of description, suppose there are data of N subbands after performing forward wavelet transform on a decompressed image according to Formula (2). Similarly, wavelet transform can be conducted on the original image and accordingly to obtain data of the N subbands according to Formula (3). According to the progressive reconstruction property of wavelet transform, a lower-quality image can be reconstructed with the first K subbands. For example, the lower-quality image of the decompressed image can be constructed with data in K subbands $\hat{B}_1$, $\hat{B}_2$, . . . , $\hat{B}_K$ according to Formula (5):

$$\hat{x}_K = G(\hat{B}_1, \hat{B}_2, \ldots, \hat{B}_K, O, \ldots, O), K=1,2, \ldots, N \quad (5)$$

where G represents the inverse wavelet transform, and O represents the all-zeros subbands, which means the element values in subbands $\hat{B}_{K+1}, \ldots, \hat{B}_N$ are equal to 0. If K is equal to N, there will be no "O" in equation (5).

Likewise, the lower-quality image of the original image can be constructed with data in K subbands $B_1, B_2, \ldots, B_K$ according to Formula (6):

$$x_K = G(B_1, B_2, \ldots, B_K, O, \ldots, O), K=1,2, \ldots, N \quad (6)$$

where G represents the inverse wavelet transform, and O represents the all-zeros subbands, which means the element values in subbands $B_{K+1}, \ldots, B_N$ are equal to 0. If K is equal to N, there will be no "O" in equation (6).

In the step-by-step training stage, the CNN model for each subband is trained progressively and sequentially. For example, the CNN model for the first subband is trained first, and then the first CNN model is fixed while training the CNN model for the second subband, and so on. When the CNN model is trained for the K-th subband, the first K reconstructed subbands can be utilized to reconstruct the image according to Formula (7).

$$\tilde{x}_K = G(\tilde{B}_1, \tilde{B}_2, \ldots, \tilde{B}_K) = G(R_1(\hat{B}_1), R_2(\hat{B}_2), \ldots, R_K(\hat{B}_K)$$
$$O, \ldots, O), K=1,2, \ldots, N \quad (7)$$

where G represents the inverse wavelet transform, $R_i$ represents the CNN model for the i-th subband, $\hat{B}_1, \hat{B}_2, \ldots, \hat{B}_K$ are wavelet-transformed data in the first K subbands, $\tilde{B}_1$, $\tilde{B}_2, \ldots, \tilde{B}_K$ are filtered data in the first K subbands, and O represents the all-zeros subbands, which means the element values in subbands $\tilde{B}_{K+1}, \ldots, \tilde{B}_N$ are equal to 0. If K is equal to N, there will be no "O" in equation (7). When the CNN model for the K-th subband is trained, the first to the (K–1)-th CNN models are fixed, and the optimization target is to minimize the distance D between the reconstructed image data $\tilde{x}_K$ and the original image data x (or the decompressed image data) by adjusting the parameters of $R_K$, which can be described by Formula (8):

$$R_K^* = \operatorname{argmin} D(x, \tilde{x}_K), K=1,2 \ldots, N \quad (8)$$

where $R_i^*$ represents the adjusted CNN model for the i-th subband.

In this way, a series of CNN models for all the subbands can be progressively and sequentially trained and these models will be utilized for the joint training.

FIG. 17 is a flow chart of an exemplary method 1700 for progressively training CNN models for multiple wavelet subbands, in accordance with some implementations of the present disclosure. Method 1700 may be implemented by a video processor associated with a model training apparatus (e.g., training apparatus 1810 of FIG. 18), and may include steps 1702-1718 as described below. Specifically, method 1700 may be performed to implement step 1604 of method 1600. Some of the steps may be optional to perform the disclosure provided herein. Further, some of the steps may be performed simultaneously, or in a different order than shown in FIG. 17.

In step 1702, the video processor may sort the plurality of wavebands in a predetermined order. For example, the N subbands may be sorted from $1^{st}$ subband to N-th subband.

In step 1704, the video processor may train the CNN model for the $1^{st}$ subband. The video processor may then progressively train the CNN models for the $2^{nd}$ subband to the N-th subband by performing steps 1706-1718 in loops.

In step 1706, the video processor may start training the CNN model for the K-th subband.

In step 1708, the video processor may perform a wavelet transform on a training image to obtain data in the plurality of the subbands. For example, the video processor may perform the wavelet transform according to Formula (2) if the training image is a decompressed image or Formula (3) if the training image is an original image.

In step 1710, the video processor may filter the data of the first K subbands with the CNN models trained for the first K−1 subbands and CNN model for the K-th subband with its current model parameters.

In step 1712, the video processor may perform an inverse wavelet transform on the filtered data of the first K subbands to obtain a reconstructed image. For example, the video processor may perform the wavelet transform according to Formula (5) if the training image is a decompressed image or according to Formula (6) if the training image is an original image. Reconstruction of the original image can be performed similarly.

In step 1714, the video processor may adjust the current model parameters of the CNN model for the K-th subband while keeping the model parameters of the CNN models trained for the first K−1 subbands fixed to minimize a difference between the training image and the reconstructed image. For example, the adjustment and optimization of the model parameters of the K-th subband may be performed according to Formula (8).

In step 1716, the video processor may check if CNN models of all subbands have been progressively trained. If so (step 1716:Yes), method 1700 may conclude and step 1606 of method 1600 may be performed. Otherwise (step 1716: No), method 1700 may update K=K+1 in step 1718, and return to step 1706 to train the CNN model for the next subband.

Returning to FIG. 16 and method 1600, in step 1606, the video processor may jointly train the CNN models with the training samples using the progressively trained CNN models as an initialization. In some implementations, joint training may be based on the CNN models of the step-by-step training performed in step 1604. In step 1604, each CNN model is trained sequentially and separately, which may fall into local optimum. In step 1606, the CNN models trained in step 1604 may be utilized as the initialization and these models are jointly trained in an end-to-end manner, e.g., according to Formula (9):

$$R_1^*, \ldots, R_N^* = \text{argmin } D(x, \tilde{x}) \tag{9}$$

where $R_i^*$ represents the adjusted CNN model for the i-th subband, and D represents a distance between the reconstructed image data $\tilde{x}_K$ and the original image data x.

In some implementations, jointly training the CNN models in step 1606 may be performed by performing a wavelet transform on a training image to obtain data in the plurality of the subbands, filtering the data of the plurality of subbands with the CNN models with current model parameters, performing an inverse wavelet transform on the filtered data of the plurality of subbands to obtain a reconstructed image, and adjusting the current model parameters of all the CNN models jointly to minimize a difference between the training image and the reconstructed image. Unlike the step 1604 where the model parameters of only one CNN model are adjusted at a given optimization loop with parameters of other CNN models trained before it fixed, in step 1606, model parameters of all the CNN models are jointly optimized.

In step 1608, the video processor may provide the CNN models for in-loop filtering in video coding. FIG. 18 is a block diagram illustrating a training apparatus 1810 and a video processing apparatus 1820, in accordance with some implementations of the present disclosure. Training apparatus 1810 is configured to train the CNN models, e.g., by performing methods 1600 and 1700, using training samples received from database 1830. Database 1830 may include storage medium that stores the training samples. Training apparatus 1810 provides the trained CNN models to video processing apparatus 1820 for in-loop filtering in video coding. Video processing apparatus 1820 may perform, e.g., methods 900, 1200, and 1400, to process the video data using the trained CNN models. In particular, video processing apparatus 1820 may perform the disclosed wavelet-domain CNNLF method, region-based adaptive CNNLF switching method, and CNN model index merge method.

While method 1600 is described above for training QP-dependent models, i.e., a CNN model is trained for each QP, in some implementations, method 1600 may be adapted to train QP-independent CNN models.

There are two methods to incorporate QP into the architecture of FIG. 11. In the first method, QP is spanned to QP map, concatenated with the subbands and then used as the input of the CNN models. In the second method, QP is used to modulate the feature maps of CNNs. QP is first spanned to a vector, and used as the input of a fully connected layer. The output of the fully connected layer is used to modulate the CNN feature map by multiplication operation.

To train the QP-independent models, training data of different QPs is mixed. Accordingly, the filtering process used during training can be described using Formula (10):

$$\tilde{B}_k = R_k(\hat{B}_k | QP), K=1,2 \ldots ,N \tag{10}$$

where $R_k$ represents the CNN model for the k-th subband, $\hat{B}_k$ is wavelet-transformed data in the K-th subband, $\tilde{B}_k$ is filtered data in the K-th subband, and QP is a quantization parameter. Compared to Formula (7) above for training a QP-dependent CNN model, when training the QP-independent CNN model for the K-th subband, the first K reconstructed subbands can be utilized to reconstruct the image according to Formula (11):

$$\tilde{x}_K = G(\tilde{B}_1, \tilde{B}_2, \ldots , \tilde{B}_K) = G(R_1(\hat{B}_1 | QP), \tag{11}$$
$$R_2(\hat{B}_2 | QP), \ldots , R_K(\hat{B}_K | QP), O, \ldots , O), K = 1,2 \ldots , N$$

G represents the inverse wavelet transform, $R_i$ represents the CNN model for the i-th subband, $\hat{B}_1, \hat{B}_2, \ldots , \hat{B}_K$ are wavelet-transformed data in the first K subbands, $\tilde{B}_1, \tilde{B}_2, \ldots , \tilde{B}_K$ are filtered data in the first K subbands, and QP is a quantization parameter. O represents the all-zeros subbands, which means the element values in subbands
$\tilde{B}_{k+1}, \ldots, \tilde{B}_N$ are equal to 0. If K is equal to N, there will
be no "O" in equation (11).

The optimization process of the QP-independent models
is similar to that is described above for optimizing the
QP-dependent models, e.g., according to Formula (8).

FIG. 19 shows a computing environment 1910 coupled
with a user interface 1350, according to some implementa-
tions of the present disclosure. The computing environment
1910 can be part of a data processing server. For example,
both training apparatus 1810 and video processing apparatus
1820 of FIG. 18 may be implemented using computing
environment 1910. The computing environment 1910
includes a processor 1920, a memory 1930, and an Input/
Output (I/O) interface 1950.

The processor 1920 typically controls overall operations
of the computing environment 1910, such as the operations
associated with display, data acquisition, data communica-
tions, and image processing. The processor 1920 may
include one or more processors to execute instructions to
perform all or some of the steps in the above-described
methods. Moreover, the processor 1920 may include one or
more modules that facilitate the interaction between the
processor 1920 and other components. The processor 1920
may be a Central Processing Unit (CPU), a microprocessor,
a single chip machine, a Graphical Processing Unit (GPU),
or the like.

The memory 1930 is configured to store various types of
data to support the operation of the computing environment
1910. The memory 1930 may include predetermined soft-
ware 1932. Examples of such data includes instructions for
any applications or methods operated on the computing
environment 1910, video datasets, image data, etc. The
memory 1930 may be implemented by using any type of
volatile or non-volatile memory devices, or a combination
thereof, such as a Static Random Access Memory (SRAM),
an Electrically Erasable Programmable Read-Only Memory
(EEPROM), an Erasable Programmable Read-Only
Memory (EPROM), a Programmable Read-Only Memory
(PROM), a Read-Only Memory (ROM), a magnetic
memory, a flash memory, a magnetic or optical disk.

The I/O interface 1950 provides an interface between the
processor 1920 and peripheral interface modules, such as a
keyboard, a click wheel, buttons, or the like. The buttons
may include but are not limited to, a home button, a start
scan button, and a stop scan button. The I/O interface 1950
can be coupled with an encoder and decoder.

In some implementations, there is also provided a non-
transitory computer-readable storage medium comprising a
plurality of programs, for example, in the memory 1930,
executable by the processor 1920 in the computing envi-
ronment 1910, for performing the above-described methods.
Alternatively, the non-transitory computer-readable storage
medium may have stored therein a bitstream or a data stream
comprising encoded video information (for example, video
information comprising one or more syntax elements) gen-
erated by an encoder (for example, video encoder 20 in FIG.
2) using, for example, the encoding method described above
for use by a decoder (for example, video decoder 30 in FIG.
3) in decoding video data. The non-transitory computer-
readable storage medium may be, for example, a ROM, a
Random Access Memory (RAM), a CD-ROM, a magnetic
tape, a floppy disc, an optical data storage device or the like.

In some implementations, there is also provided a com-
puting device comprising one or more processors (for
example, the processor 1920); and the non-transitory com-
puter-readable storage medium or the memory 1930 having stored therein a plurality of programs executable by the one
or more processors, where the one or more processors, upon
execution of the plurality of programs, are configured to
perform the above-described methods.

In some implementations, there is also provided a com-
puter program product comprising a plurality of programs,
for example, in the memory 1930, executable by the pro-
cessor 1920 in the computing environment 1910, for per-
forming the above-described methods. For example, the
computer program product may include the non-transitory
computer-readable storage medium.

In some implementations, the computing environment
1910 may be implemented with one or more ASICs, DSPs,
Digital Signal Processing Devices (DSPDs), Programmable
Logic Devices (PLDs), FPGAs, GPUs, controllers, micro-
controllers, microprocessors, or other electronic compo-
nents, for performing the above methods.

The description of the present disclosure has been pre-
sented for purposes of illustration and is not intended to be
exhaustive or limited to the present disclosure. Many modi-
fications, variations, and alternative implementations will be
apparent to those of ordinary skill in the art having the
benefit of the teachings presented in the foregoing descrip-
tions and the associated drawings.

Unless specifically stated otherwise, an order of steps of
the method according to the present disclosure is only
intended to be illustrative, and the steps of the method
according to the present disclosure are not limited to the
order specifically described above, but may be changed
according to practical conditions. In addition, at least one of
the steps of the method according to the present disclosure
may be adjusted, combined or deleted according to practical
requirements.

The examples were chosen and described in order to
explain the principles of the disclosure and to enable others
skilled in the art to understand the disclosure for various
implementations and to best utilize the underlying principles
and various implementations with various modifications as
are suited to the particular use contemplated. Therefore, it is
to be understood that the scope of the disclosure is not to be
limited to the specific examples of the implementations
disclosed and that modifications and other implementations
are intended to be included within the scope of the present
disclosure.

What is claimed is:

1. A method, comprising:
receiving, by a video processor, a video block of a video
for in-loop filtering;
partitioning the video block into a plurality of regions;
adaptively determining, for each partitioned region,
whether to apply a wavelet-domain CNN filtering to the
partitioned region; and
performing the wavelet-domain CNN filtering on video
data of each partitioned region to which the wavelet-
domain CNN filtering is determined to be applied,
comprising:
performing, by the video processor, a wavelet trans-
form on the video data to obtain data in a wavelet
domain comprising a plurality of wavelet subbands;
filtering, by the video processor, the data in the wavelet
domain by applying respective CNN models on the
plurality of wavelet subbands, wherein each CNN
model is trained for a respective one of the plurality
of wavelet subbands in the wavelet domain, and a
number of the CNN models is equal to a number of
the plurality of wavelet subbands; and performing, by the video processor, an inverse wavelet transform on the filtered data to obtain reconstructed video data.

2. The method of claim 1, wherein the CNN models are quantization parameter (QP)-dependent, wherein the CNN models are trained using training samples of a single QP or mixed training samples of different QPs.

3. The method of claim 1, wherein adaptively determining, for each partitioned region, whether to apply the wavelet-domain CNN filtering to the partitioned region comprises:

receiving a flag of each partitioned region of the video block, wherein the flag indicates whether the wavelet-domain CNN filtering is applied to the partitioned region;

adaptively determining whether to apply the wavelet-domain CNN filtering to the partitioned region according to the flag;

wherein performing the wavelet-domain CNN filtering on the video data of each partitioned region to which the wavelet-domain CNN filtering is determined to be applied comprises:

receiving a CNN model index of each partitioned region to which the wavelet-domain CNN filtering is applied, wherein the CNN model index indicates the CNN models used for the partitioned region when there are more than one CNN model; and performing the wavelet-domain CNN filtering on the video data of each partitioned region to which the wavelet-domain CNN filtering is determined to be applied according to the CNN model index.

4. The method of claim 1, wherein partitioning the video block into the plurality of regions comprises:

partitioning the video block into the plurality of regions using a partitioning pattern selected by performing a rate distortion optimization by an encoder.

5. The method of claim 1, wherein partitioning the video block into the plurality of regions comprises:

receiving a partition pattern index of the video block, wherein the partition pattern index indicates a partitioning pattern used to partition the video block; and partitioning the video block according to the partition pattern index.

6. The method of claim 1, further comprising:

receiving a new video block for in-loop filtering;

receiving a flag that indicates that a CNN model index of the new video block is inherited from a neighboring video block of the new video block; and performing the wavelet-domain CNN filtering on video data of at least a part of the new video block using the CNN models applied to the video data of at least a part of the neighboring video block.

7. The method of claim 6, further comprising:

receiving a CNN model merge index of the new video block, wherein the CNN model merge index indicates a position of the neighboring video block relative to the new video block.

8. The method of claim 6, wherein the neighboring video block is left to the new video block, wherein no CNN model merge index is signaled for the new video block.

9. A method, comprising:

progressively training, by a video processor, Convolutional Neural Network (CNN) models for a plurality of wavelet subbands at least by training each CNN model for a respective one of the plurality of wavelet subbands, wherein a number of the CNN models is equal to a number of the plurality of wavelet subbands, and the CNN models are trained sequentially in a predetermined order of the plurality of wavelet subbands;

jointly training, by the video processor, the CNN models using the progressively trained CNN models as an initialization; and providing the CNN models for in-loop filtering of a video block in a wavelet-domain, wherein progressively training the CNN models for the plurality of wavelet subbands comprises:

sorting the plurality of wavelet subbands in the predetermined order;

training a CNN model for a $1^{st}$ subband; and training a CNN model for each K-th subband by adjusting model parameters of the CNN model for the K-th subband with model parameters of the CNN models trained for first K−1 subbands fixed, wherein K is an integer greater than 1.

10. The method of claim 9, wherein adjusting model parameters of the CNN model for the K-th subband comprises:

performing a wavelet transform on a training image to obtain data in the plurality of wavelet subbands;

filtering data of first K subbands with the CNN models trained for the first K−1 subbands and the CNN model for the K-th subband with its current model parameters;

performing an inverse wavelet transform on the filtered data of the first K subbands to obtain a reconstructed image; and adjusting the current model parameters of the CNN model for the K-th subband while keeping the model parameters of the CNN models trained for the first K−1 subbands fixed to minimize a difference between the training image and the reconstructed image.

11. The method of claim 10, wherein performing the inverse wavelet transform on the filtered data of the first K subbands to obtain the reconstructed image comprises:

performing the inverse wavelet transform on the filtered data of the first K subbands and data in remaining subbands by setting the data in the remaining subbands to 0 to obtain the reconstructed image.

12. The method of claim 9, wherein jointly training the CNN models comprises:

performing a wavelet transform on a training image to obtain data in the plurality of wavelet subbands;

filtering the data of the plurality of wavelet subbands with the CNN models with current model parameters;

performing an inverse wavelet transform on the filtered data of the plurality of wavelet subbands to obtain a reconstructed image; and adjusting the current model parameters of all the CNN models jointly to minimize a difference between the training image and the reconstructed image.

13. The method of claim 9, wherein the CNN models are quantization parameter (QP)-dependent, wherein the CNN models are trained using training samples of a single QP.

14. The method of claim 9, wherein the CNN models are QP-independent, wherein the CNN models are trained using mixed training samples of different QPs.

15. The method of claim 14, further comprising:

spanning the different QPs to a QP map;

concatenating the QP map with the plurality of wavelet subbands; and inputting the concatenated QP map to the CNN models.

16. The method of claim 14, further comprising:

spanning the different QPs to a QP vector; and modulating feature maps of the CNN models with the QP vector.

17. A non-transitory computer readable storage medium storing a bitstream generated by or to be decoded by a method, the method comprising:

receiving, by a video processor, a video block of a video for in-loop filtering;

partitioning the video block into a plurality of regions;

adaptively determining, for each partitioned region, whether to apply a wavelet-domain CNN filtering to the partitioned region; and performing the wavelet-domain CNN filtering on video data of each partitioned region to which the wavelet-domain CNN filtering is determined to be applied, comprising:

performing, by the video processor, a wavelet transform on the video data to obtain data in a wavelet domain comprising a plurality of wavelet subbands;

filtering, by the video processor, the data in the wavelet domain by applying respective CNN models on the plurality of wavelet subbands, wherein each CNN model is trained for a respective one of the plurality of wavelet subbands in the wavelet domain, and a number of the CNN models is equal to a number of the plurality of wavelet subbands; and performing, by the video processor, an inverse wavelet transform on the filtered data to obtain reconstructed video data.

\* \* \* \* \*